(12) United States Patent
Choi et al.

(10) Patent No.: US 7,634,006 B2
(45) Date of Patent: Dec. 15, 2009

(54) VSB COMMUNICATION SYSTEM

(75) Inventors: In Hwan Choi, Gyeonggi-do (KR); Young Mo Gu, Seoul (KR); Kyung Won Kang, Seoul (KR); Kook Yeon Kwak, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 817 days.

(21) Appl. No.: 10/971,281

(22) Filed: Oct. 21, 2004

(65) Prior Publication Data

US 2006/0039462 A1    Feb. 23, 2006

Related U.S. Application Data

(63) Continuation of application No. 09/933,353, filed on Aug. 20, 2001, now Pat. No. 6,947,487.

(30) Foreign Application Priority Data

Apr. 18, 2001   (KR)   ............................... 2001-20929
May 23, 2001   (KR)   ............................... 2001-28405

(51) Int. Cl.
*H04N 7/12* (2006.01)
*H04N 5/455* (2006.01)
*H03M 13/00* (2006.01)

(52) U.S. Cl. ..................... 375/240.1; 348/726; 714/756

(58) Field of Classification Search .............. 375/240.1, 375/240.01, 240.25, 321; 348/726; 714/756, 714/786
See application file for complete search history.

(56) References Cited

U.S. PATENT DOCUMENTS

| | | | |
|---|---|---|---|
| 4,980,897 A | 12/1990 | Decker et al. | |
| 5,087,975 A | 2/1992 | Citta et al. | |
| 5,233,630 A | 8/1993 | Wolf | |
| 5,309,290 A | 5/1994 | Sugiyama et al. | |
| 5,398,073 A | 3/1995 | Wei | |
| 5,488,691 A | 1/1996 | Fuoco et al. | |
| 5,555,024 A | 9/1996 | Limberg et al. | |
| 5,563,884 A | 10/1996 | Fimoff et al. | |

(Continued)

FOREIGN PATENT DOCUMENTS

KR    2000-0018531 A    4/1997

(Continued)

OTHER PUBLICATIONS

U.S. Appl. No. 60/198,014, Bretl et al.

(Continued)

*Primary Examiner*—Gims S Philippe
(74) *Attorney, Agent, or Firm*—Lee, Hong, Degerman, Kang & Waimey

(57) ABSTRACT

A VSB communication system comprises a VSB transmission system and a VSB reception system. The VSB transmission system multiplexes a coded MPEG data and a coded supplemental data having a null sequence inserted therein, with required multiplexing information included in a field synchronization signal or in a supplemental data according to a number of the supplemental data packets being transmitted. The VSB reception system detects the required multiplexing information from the field synchronization signal or the supplemental data and decodes the multiplexed data by using the null sequence and the detected multiplexing information, as well as demultiplexes the multiplexed data into the MPEG data and the supplemental data.

25 Claims, 16 Drawing Sheets

U.S. PATENT DOCUMENTS

| | | | |
|---|---|---|---|
| 5,583,889 A | 12/1996 | Citta et al. |
| 5,600,677 A | 2/1997 | Citta et al. |
| 5,602,595 A | 2/1997 | Citta et al. |
| 5,629,958 A | 5/1997 | Wilming |
| 5,636,251 A | 6/1997 | Citta et al. |
| 5,636,252 A | 6/1997 | Patel et al. |
| 5,686,966 A | 11/1997 | De La Cierva, Sr. |
| 5,692,013 A | 11/1997 | Koslov et al. |
| 5,694,419 A | 12/1997 | Lawrence et al. |
| 5,706,312 A | 1/1998 | Wei |
| 5,757,861 A | 5/1998 | Lim |
| 5,831,690 A | 11/1998 | Lyons et al. |
| 5,909,454 A | 6/1999 | Schmidt |
| 5,910,967 A | 6/1999 | Venderaar |
| 5,923,711 A | 7/1999 | Wilming |
| 5,946,047 A | 8/1999 | Levan |
| 5,953,376 A | 9/1999 | Wei |
| 5,991,341 A | 11/1999 | Shin |
| 6,040,867 A | 3/2000 | Bando et al. |
| 6,075,569 A | 6/2000 | Lee et al. |
| 6,118,825 A | 9/2000 | Ikeda et al. |
| 6,122,015 A | 9/2000 | Al-Dhahir et al. |
| 6,141,384 A | 10/2000 | Witting et al. |
| 6,178,209 B1 | 1/2001 | Hulyalkar et al. |
| 6,184,921 B1 | 2/2001 | Limberg |
| 6,201,563 B1 | 3/2001 | Rhee |
| 6,201,564 B1 | 3/2001 | Limberg |
| 6,208,643 B1 | 3/2001 | Dieterich et al. |
| 6,278,743 B1 | 8/2001 | Templin |
| 6,490,002 B1 | 12/2002 | Shintani |
| 6,493,043 B1 | 12/2002 | Bollmann et al. |
| 6,493,402 B1 | 12/2002 | Fimoff |
| 6,519,298 B1 | 2/2003 | Kim |
| 6,529,558 B1 | 3/2003 | Fimoff et al. |
| 6,690,738 B1 | 2/2004 | Swenson et al. |
| 6,697,098 B1 | 2/2004 | Wang |
| 6,708,149 B1 | 3/2004 | Turin |
| 6,724,439 B1 | 4/2004 | Horwitz |
| 6,724,832 B1 | 4/2004 | Hershberger |
| 6,738,949 B2 | 5/2004 | Senda et al. |
| 6,744,822 B1 | 6/2004 | Gaddam et al. |
| 6,760,077 B2 | 7/2004 | Choi et al. |
| 6,763,025 B2 | 7/2004 | Leatherbury et al. |
| 6,785,903 B1 | 8/2004 | Kuh |
| 6,788,710 B1 | 9/2004 | Knutson et al. |
| 6,810,084 B1 | 10/2004 | Jun et al. |
| 6,810,090 B1 | 10/2004 | Perlow |
| 6,888,840 B1 | 5/2005 | Ramaswamy et al. |
| 6,947,487 B2 * | 9/2005 | Choi et al. ............ 375/240.25 |
| 6,958,781 B2 | 10/2005 | Fimoff |
| 6,996,133 B2 | 2/2006 | Bretl et al. |
| 7,073,116 B1 * | 7/2006 | Settle et al. ................. 714/786 |
| 7,197,685 B2 * | 3/2007 | Limberg ..................... 714/756 |
| 7,215,714 B2 | 5/2007 | Bretl et al. |
| 2001/0036232 A1 | 11/2001 | Betts et al. |
| 2002/0041608 A1 | 4/2002 | Choi et al. |
| 2002/0041634 A1 | 4/2002 | Choi et al. |
| 2002/0085632 A1 | 7/2002 | Choi et al. |
| 2002/0095640 A1 | 7/2002 | Arad et al. |
| 2002/0152441 A1 | 10/2002 | Senda et al. |
| 2004/0028076 A1 | 2/2004 | Strolle et al. |
| 2004/0066738 A1 | 4/2004 | Stopler |
| 2004/0207757 A1 | 10/2004 | Fimoff |
| 2004/0240590 A1 | 12/2004 | Cameron et al. |
| 2005/0041748 A1 | 2/2005 | Choi et al. |
| 2005/0041749 A1 | 2/2005 | Choi et al. |
| 2005/0074069 A1 | 4/2005 | Choi et al. |
| 2005/0129132 A1 | 6/2005 | Choi et al. |
| 2006/0002464 A1 | 1/2006 | Choi et al. |
| 2006/0039503 A1 | 2/2006 | Choi et al. |
| 2008/0049146 A1 * | 2/2008 | Choi et al. .................. 348/726 |
| 2008/0049874 A1 * | 2/2008 | Choi et al. .................. 375/321 |
| 2008/0089408 A1 * | 4/2008 | Choi et al. ............. 375/240.01 |

FOREIGN PATENT DOCUMENTS

| | | |
|---|---|---|
| KR | 10-1997-0056904 | 7/1997 |
| KR | 1999-0065541 | 8/1999 |
| KR | 10-0253000 | 1/2000 |
| KR | 2000-0028757 A | 5/2000 |

OTHER PUBLICATIONS

S. Benedetto et al. "A soft-input soft-output maximum a posteriori (MAP) module to decode parallel and serial concatenated codes" TDA progress report 42-127, Nov. 15, 1996.

* cited by examiner ific VSB COMMUNICATION SYSTEM

CROSS REFERENCE TO RELATED ART

This is a continuation of application Ser. No. 09/933,353 filed Aug. 20, 2001 now U.S. Pat. No. 6,947,487, which application is hereby incorporated by reference in its entirety.

This application claims the benefit of Korean Patent Application Nos. 2001-20929 and 2001-28405, filed on Apr. 18, 2001 and May 23, 2001, respectively, which are hereby incorporated by reference in their entirety.

This application incorporates by reference in their entirety co-pending U.S. application Ser. No. 10/977,932, mailed via Express Mail No. EF334462226US entitled "VSB TRANSMISSION SYSTEM FOR PROCESSING SUPPLEMENTAL TRANSMISSION DATA" and Ser. No. 11/088,006, mailed via Express Mail No. ET235110894US entitled "VSB RECEPTION SYSTEM WITH ENHANCED SIGNAL DETECTION FOR PROCESSING SUPPLEMENTAL DATA."

BACKGROUND OF THE INVENTION

1. Field of the Invention

The present invention relates to a digital television transmission system, and more particularly, to a 8T-VSB (Vestigial Sideband) communication system for transmitting and receiving supplemental data in addition to MPEG data and to a signal format for the VSB communication system.

2. Description of the Related Art

The United States of America has employed ATSC 8T-VSB (8 Trellis-Vestigial Sideband) as a standard since 1995, and has been broadcasting in the ATSC 8T-VSB since the later half of 1998. South Korea also has employed the ATSC 8T-VSB as a standard. South Korea started test broadcasting in May 1995, and has since August 2000 put in place a regular test broadcasting system. The advancement of technology allows the transmission of digital television (DTV) in the same 6 MHz bandwidth currently used by NTSC.

FIG. 1B illustrates a block diagram of a conventional ATSC 8T-VSB transmission system 6 ("VSB transmission system"). The VSB transmission system 6 generally comprises a data randomizer 11, Reed-Solomon coder 12, data interleaver 13, Trellis coder 14, multiplexer 15, pilot inserter 16, VSB modulator 17 and RF converter 18.

Referring to FIG. 1B, there is a data randomizer 11 for receiving and making random MPEG data (video, audio and ancillary data). The data randomizer 11 receives the MPEG-II data output from an MPEG-II encoder. Although not shown in FIG. 1B, the MPEG-II encoder takes baseband digital video and performs bit rate compression using the techniques of discrete cosine transform, run length coding, and bi-directional motion prediction. The MPEG-II encoder then multiplexes this compressed data together with pre-coded audio and any ancillary data that will be transmitted. The result is a stream of compressed MPEG-II data packets with a data frequency of only 19.39 Mbit/Sec. The MPEG-II encoder outputs such data to the data randomizer in serial form. MPEG-II packets are 188 bytes in length with the first byte in each packet always being the sync or header byte. The MPEG-II sync byte is then discarded. The sync byte will ultimately be replaced by the ATSC segment sync in a later stage of processing.

In the VSB transmission system 6, the 8-VSB bit stream should have a random, noise-like signal. The reason being that the transmitted signal frequency response must have a flat noise-like spectrum in order to use the allotted 6 MHz channel space with maximum efficiency. Random data minimizes interference into analog NTSC. In the data randomizer 11, each byte value is changed according to known pattern of pseudo-random number generation. This process is reversed in the VSB receiver in order to recover the proper data values.

The Reed-Solomon coder 12 of the VSB transmission system 6 is used for subjecting the output data of the data randomizer 11 to Reed-Solomon coding and adding a 20 byte parity code to the output data. Reed Solomon encoding is a type of forward error correction scheme applied to the incoming data stream. Forward error correction is used to correct bit errors that occur during transmission due to signal fades, noise, etc. Various types of techniques may be used as the forward error correction process.

The Reed-Solomon coder 12 takes all 187 bytes of an incoming MPEG-II data packet (the sync or header byte has been removed from 188 bytes) and mathematically manipulates them as a block to create a digital sketch of the block contents. This "sketch" occupies 20 additional bytes which are added at the tail end of the original 187 byte packet. These 20 bytes are known as Reed-Solomon parity bytes. The 20 Reed-Solomon parity bytes for every data packet add redundancy for forward error correction of up to 10 byte errors/packet. Since Reed-Solomon decoders correct byte errors, and bytes can have anywhere from 1 to 8 bit errors within them, a significant amount of error correction can be accomplished in the VSB reception system. The output of the Reed-Solomon coder 12 is 207 bytes (187 plus 20 parity bytes).

The VSB reception system will compare the received 187 byte block to the 20 parity bytes in order to determine the validity of the recovered data. If errors are detected, the receiver can use the parity bytes to locate the exact location of the errors, modify the corrupted bytes, and reconstruct the original information.

The data interleaver 13 interleaves the output data of the Reed-Solomon coder 12. In particular, the data interleaver 13 mixes the sequential order of the data packet and disperses or delays the MPEG-II packet throughout time. The data interleaver 13 then reassembles new data packets incorporating small sections from many different MPEG-II (pre-interleaved) packets. The reassembled packets are 207 bytes each.

The purpose of the data interleaver 13 is to prevent losing of one or more packets due to noise or other harmful transmission environment. By interleaving data into many different packets, even if one packet is completely lost, the original packet may be substantially recovered from information contained in other packets.

The VSB transmission system 6 also has a trellis coder 14 for converting the output data of the data interleaver 13 from byte form into symbol form and for subjecting it to trellis coding. In the trellis coder 14, bytes from the data interleaver 13 are converted into symbols and provided one by one to a plurality of Trellis coders and precoders shown in FIG. 9.

Trellis coding is another form of forward error correction. Unlike Reed-Solomon coding, which treated the entire MPEG-II packet simultaneously as a block, trellis coding is an evolving code that tracks the progressing stream of bits as it develops through time.

The trellis coder 14 adds additional redundancy to the signal in the form of more (than four data levels, creating the multilevel (8) data symbols for transmission. For trellis coding, each 8-bit byte is split up into a stream of four, 2-bit words. In the trellis coder 14, each 2-bit input word is compared to the past history of previous 2-bit words. A 3-bit binary code is mathematically generated to describe the transition from the previous 2-bit word to the current one. These 3-bit codes are substituted for the original 2-bit words and transmitted as the eight level symbols of 8-VSB. For every two bits that enter the trellis coder 14, three bits are produced.

The trellis decoder in the VSB receiver uses the received 3-bit transition codes to reconstruct the evolution of the data stream from one 2-bit word to the next. In this way, the trellis coder follows a "trail" as the signal moves from one word to the next through time. The power of trellis coding lies in its ability to track a signal's history through time and discard potentially faulty information (errors) based on a signal's past and future behavior.

A multiplexer 15 is used for multiplexing a symbol stream from the trellis coder 14 and synchronizing signals. The segment and the field synchronizing signals provide information to the VSB receiver to accurately locate and demodulate the transmitted RF signal. The segment and the field synchronizing signals are inserted after the randomization and error coding stages so as not to destroy the fixed time and amplitude relationships that these signals must possess to be effective. The multiplexer 15 provides the output from the trellis coder 14 and the segment and the field synchronizing signals in a time division manner.

An output packet of the data interleaver 13 comprises the 207 bytes of an interleaved data packet. After trellis coding, the 207 byte segment is stretched out into a baseband stream of 828 eight level symbols. The segment synchronizing signal is a four symbol pulse that is added to the front of each data segment and replaces the missing first byte (packet sync byte) of the original MPEG-II data packet. The segment synchronizing signal appears once every 832 symbols and always takes the form of a positive-negative-positive pulse swinging between the +5 and −5 signal levels The field synchronizing signal is an entire data segment that is repeated once per field. The field synchronizing signal has a known data symbol pattern of positive-negative pulses and is used by the receiver to eliminate signal ghosts caused by poor reception.

The VSB transmission system 6 also has the pilot inserter 16 for inserting pilot signals into the symbol stream from the multiplexer 15. Similar to the synchronizing signals described above, the pilot signal is inserted after the randomization and error coding stages so as not to destroy the fixed time and amplitude relationships that these signals must possess to be effective.

Before the data is modulated, a small DC shift is applied to the 8T-VSB baseband signal. This causes a small residual carrier to appear at the zero frequency point of the resulting modulated spectrum. This is the pilot signal provided by the pilot inserter 16. This gives the RF PLL circuits in the VSB receiver something to lock onto that is independent of the data being transmitted.

After the pilot signal has been inserted by the pilot inserter 16, the output is subjected to a VSB modulator 17. The VSB modulator 17 modulates the symbol stream from the pilot inserter 16 into an 8 VSB signal of an intermediate frequency band. The VSB modulator 17 provides a filtered (root-raised cosine) IF signal at a standard frequency (44 Mhz in the U.S.), with most of one sideband removed.

In particular, the eight level baseband signal is amplitude modulated onto an intermediate frequency (IF) carrier. The modulation produces a double sideband IF spectrum about the carrier frequency. The total spectrum is too wide to be transmitted in the assigned 6 MHz channel.

The sidelobes produced by the modulation are simply scaled copies of the center spectrum, and the entire lower sideband is a mirror image of the upper sideband. Therefore using a filter, the VSB modulator discards the entire lower sideband and all of the sidelobes in the upper sideband. The remaining signal (upper half of the center spectrum) is further eliminated in one-half by using the Nyquist filter. The Nyquist filter is based on the Nyquist Theory, which summarizes that only a ½ frequency bandwidth is required to transmit a digital signal at a given sampling rate.

Finally, there is an RF (Radio Frequency) converter 18 for converting the signal of an intermediate frequency band from the VSB modulator 17 into a signal of a RF band signal, and for transmitting the signal to a reception system through an antenna 19.

The foregoing VSB communication system is at least partially described in U.S. Pat. Nos. 5,636,251, 5,629,958 and 5,600,677 by Zenith Co. which are incorporated herein by reference. The 8T-VSB transmission system, which is employed as the standard digital TV broadcasting in North America and South Korea, was developed for the transmission of MPEG video and audio data. As technologies for processing digital signals develop and the use of the Internet increases, the trend currently is to integrate digitized home appliances, the personal computer, and the Internet into one comprehensive system.

Therefore, in order to satisfy the variety of the demands of users, there is a need to develop a communication system that facilitates the addition and transmittal of a variety of supplemental data to the video and audio data through the digital broadcasting channel. It is predicted that the use of supplemental data broadcasting may require PC (Personal Computer) cards or portable appliances, with simple indoor antennas.

However, there can be a substantial reduction of signal strength due to walls and nearby moving bodies. There also can be ghost and noise caused by reflective waves, which causes the performance of the signal of the supplemental data broadcasting to be substantially poor. Supplemental data broadcasting is different from general video and audio data in that it requires a lower error ratio in transmission. For general video and audio data, errors imperceptible to the human eye or ear are inconsequential. In contrast, for supplemental data, even one bit of error in the supplemental data (which may include program execution files, stock information, and other similar information) may cause a serious problem. Therefore, the development of a communication system that is more resistant to the ghost and noise occurring on the channel is absolutely required.

In general, the supplemental data is transmitted by a time division system on a channel similar to the MPEG video and audio data. After the incorporation of digital broadcasting, there has already been a widespread emergence in the home appliance market of receivers equipped to receive ATSC VSB digital broadcast signals. These products receive MPEG video and audio data only. Therefore, it is required that the transmission of supplemental data on the same channel as the MPEG video and audio data has no adverse influence on the existing receivers that are equipped to receive ATSC VSB digital broadcasting. Such objective is defined as ATSC VSB backward compatibility, and the supplemental data broadcasting system must be a system that is backward-compatible with the ATSC VSB communication system.

In the meantime, in a poor channel environment, the reception performance of the existing ATSC VSB reception system may decrease. Because the supplemental data and the MPEG data are multiplexed in segment units, the order of multiplexing is closely related to the receiving performance of the supplemental data. That is, the receiving performance of the supplemental data may be significantly poor depending on the order of multiplexing.

SUMMARY OF THE INVENTION

Accordingly, the present invention is directed to a VSB communication system that substantially obviates one or more of the problems due to limitations and disadvantages of the related art.

An object of the present invention is to provide a new VSB communication system which is suitable for transmission of a supplemental data, and robust to noise and ghost (multipath).

Another object of the present invention is to provide a VSB communication system that can enhance receiving performance.

A further object of the present invention is to provide a method for multiplexing supplemental data and MPEG data in a VSB communication system, and for improving receiving performance of the VSB communication system.

Additional features and advantages of the invention will be set forth in the description that follows, and in part will be apparent from the description, or may be learned by the practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, segments of supplemental data packets received through a first path of a VSB communication system and segments of MPEG transport packets received through a second path of the VSB communication system are multiplexed under a fixed rule within a data field.

According to an embodiment of the present invention, a VSB communication system comprises a VSB transmission system for multiplexing a coded MPEG data and a coded supplemental data having a null sequence inserted therein with required multiplexing information included thereto according to supplemental data packets, and transmitting a multiplexed data field; and a VSB reception system for detecting the required multiplexing information from the multiplexed data field, decoding the multiplexed data field by using the null sequence and the detected multiplexing information, and demultiplexing the multiplexed data into the MPEG data and the supplemental data in response to the multiplexing information. Preferably, the multiplexing information of the supplemental data is within the multiplexed data field. The preferred multiplexing ratio of the supplemental data and the MPEG data is one segment to one segment (1:1) or one segment to three segments (1:3).

According to an aspect of the present invention, the number of the supplemental data packets multiplexed within one multiplexed data field is preferably between 0 to 156. The multiplexing information is contained in at least one of a reserved area of a field synchronizing signal segment in the multiplexed data field and a first supplemental data segment after the field synchronizing signal segment.

According to another aspect of the present invention, the multiplexing information is in the reserved area that includes 92 symbols having a first value (preferably a current 'P' value, a second value (preferably a count down value before changing the current 'P' value) and a third value (preferably a next 'P' value to be changed). The current 'P' value occupies at least 8 bits, count down value occupies at least 8 bits, and the next 'P' value to be changed occupies at least 8 bits. Preferably, the reserved area is divided into first and second 12 bit sections, the first and the second 12 bit section being inverted with respect to each other. The second 12 bit section is a bit-wise inversion of the first 12 bit section.

A method for processing MPEG and supplemental data packets in a VSB transmission system with a supplemental data coder is described. In such process, the supplement data coder generates coded supplemental data packets from the supplemental data packets. The method comprises the steps of multiplexing the coded supplemental data packets and MPEG data packets in at least one data field, the data field having a plurality of segments, each segment corresponding to at least one of the coded supplemental data packets and the MPEG data packets, wherein the multiplexing is performed in response to a number of the supplemental data packets; and modulating the multiplexed data field in the VSB transmission system.

The method further comprises subjecting the supplemental data packets to Reed-Solomon coding for error correction; inserting a null sequence into the Reed-Solomon coded supplemental data packets; and adding the MPEG header to the supplemental data packets having the null sequence inserted therein to obtain the coded supplemental data packets. The supplemental data packets may be subjected to interleaving for enhancing resistance to burst noise.

A method for processing MPEG and coded supplemental data packets in a VSB reception system having a supplemental data decoder to generate the supplemental data packets from the coded supplemental data packets is described. The method comprises the steps of detecting multiplexing information from a data field received by the VSB reception system, the multiplexing information being prepared in response to a number of the supplemental data packets and containing demultiplexing information for separating supplemental data segments and the MPEG data segments; demultiplexing the data field into the MPEG data packets and the coded supplemental data packet by using the multiplexing information; and using the supplemental data decoder, decoding the coded supplemental data packets to obtain the supplemental data packets.

Alternatively, a method for multiplexing MPEG data and supplemental data in a VSB transmission system comprises the steps of determining a number of supplemental data packets to be multiplexed with MPEG data segments in a data field, wherein the data field includes a plurality of MPEG and supplemental data segements; and assigning a position of the supplemental data segment to every Y segment of the data field starting from a preselected start position of the data field in sequential order until the end of the data field, and assigning remaining supplemental data segments to every Y segment of the data field starting from a subsequent start position that is offset by a predefined offset position from a previous start position of the data field.

According to an aspect of the present invention, Y is preferably every fourth segment and the predefined offset position is one segment. In addition, the preselected start position is preferably adjacent to a field synchronization signal segment.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1A:
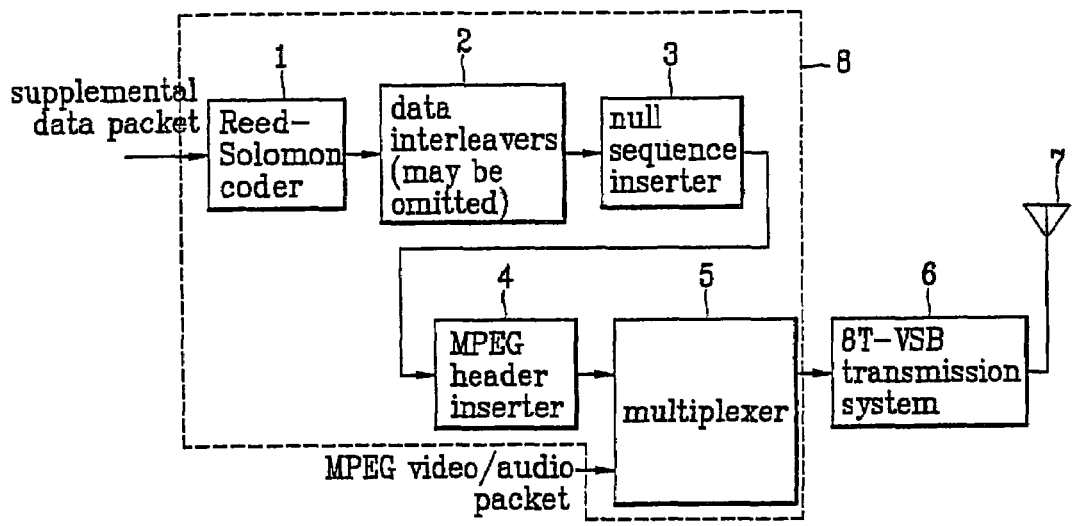
FIG. 1A illustrates a block diagram showing a VSB transmission system and a supplemental data encoder in a VSB communication system in accordance with a preferred embodiment of the present invention.

The VSB communication system according to a preferred embodiment of the present invention includes a transmission system and a reception system. In FIG. 1A, the VSB transmitter 110 in accordance with a preferred embodiment of the present invention includes a VSB supplemental data encoder 8 and a VSB transmission system 6. The description of the VSB transmission system 6 is described above in connection with FIG. 1B, and thus, will not be repeated. According to the preferred embodiment of the present invention, the VSB supplemental data encoder 8 includes a Reed-Solomon coder 1, a data interleaver 2, a null sequence inserter 3, an MPEG header inserter 4, a multiplexer 5, an 8T-VSB transmission system 6, and an antenna 7.

As shown in FIG. 1A, for the transmission of the supplemental data from the VSB transmitter 110 (i.e., a broadcasting station) to a VSB reception system on a channel (terrestrial or cable), the VSB transmitter 110 subjects the supplemental data to various digital signal processes. To provide backward compatibility of the present invention with existing devices, the supplemental data is preferably 164 byte packet which will eventually be processed to be a 187 byte packet before entering the VSB transmission system 16. However, the size of the supplemental data packet may be varied so long as the output of the VSB supplemental data encoder 8 is compatible with the VSB transmission system 6.

In the VSB supplemental data encoder 8, there is provided a Reed-Solomon coder 1 for the correction of errors. The supplemental data is coded at a Reed-Solomon coder (or R-S coder) 1. Preferably, the Reed-Solomon coder 1 is used for subjecting the supplemental data to Reed-Solomon coding and adding a 20 byte parity code to the output data. As described above, Reed Solomon encoding is a type of forward error correction scheme applied to the incoming data stream. Forward error correction is used to correct bit errors that occur during transmission due to signal fades, noise, etc. Various other types of error correction techniques known to one of ordinary skill in the art may be used as the forward error correction process.

According to the preferred embodiment, the Reed-Solomon coder 1 of the VSB supplemental data encoder 8 takes 164 bytes of an incoming supplemental data packet and mathematically manipulates them as a block to create a digital sketch of the block contents. The 20 additional bytes are added at the tail end of the original 164 byte packet. These 20 bytes are known as Reed-Solomon parity bytes. Since Reed-Solomon decoders of the VSB reception system correct byte errors, and bytes can have anywhere from 1 to 8 bit errors within them, a significant amount of error correction can be accomplished in the VSB receiver. The output of the Reed-Solomon coder 1 is preferably 184 bytes (164 bytes from the original packet plus 20 parity bytes).

The VSB supplemental data encoder 8 further includes the data interleaver 2, which interleaves the output data of the Reed-Solomon coder 1. The data interleaver 2 is for interleaving the coded supplemental data to enhance performance against burst noise. The data interleaver 2 may be omitted without deviating from the gist of the present invention.

The data interleaver 2 according to the preferred embodiment mixes the sequential order of the supplemental data packet and disperses or delays the supplemental data packet throughout time. The data interleaver 2 then reassembles new data packets incorporating small sections from many different supplemental data packets. Each one of the reassembled packets are 184 bytes long.

As described above, the purpose of the data interleaver 2 is to prevent losing of one or more packets due to noise or other harmful transmission environment. By interleaving data into many different packets, even if one packet is completely lost, the original packet may be recovered from information contained in other packets.

However, because there is a data interleaver in the ATSC 8T-VSB transmission system, the data interleaver for the supplemental data can be omitted if it is not required to enhance the burst noise performance of the supplemental data. For this reason, the data interleaver 2 may not be necessary for the VSB supplemental data encoder 8.

Figure 1B:
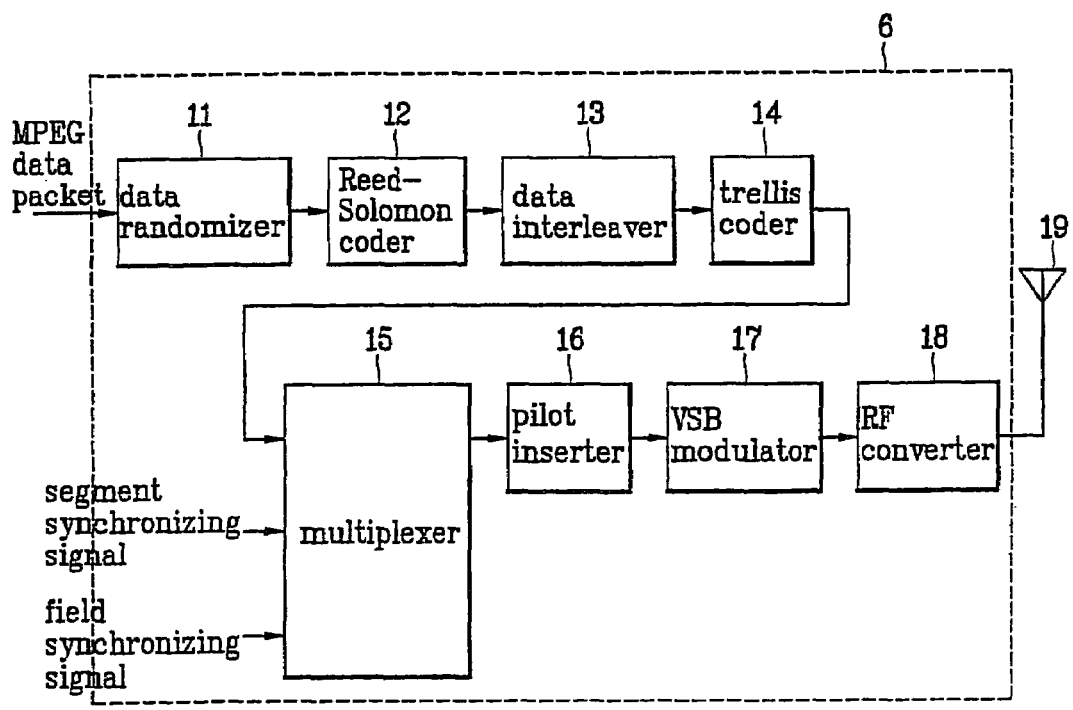
FIG. 1B illustrates a block diagram of a VSB transmission system in FIG. 1A.

The VSB supplemental data encoder 8 also includes the null sequence inserter 3 for inserting a null sequence to an allocated region of the interleaved (if the data interleaver 2 was present) or Reed-Solomon coded supplemental data for generating the predefined sequence for the supplemental data at an input terminal of a Trellis coder (shown in FIG. 1B). The null sequence is inserted so that the VSB reception system receives the supplemental data more reliably, even in a noisy channel or a multipath fading channel.

Further referring to FIG. 1A, the VSB supplemental data encoder 8 includes the MPEG header inserter 4 for adding an MPEG header to the supplemental data having the null sequence inserted thereto, for backward-compatibility with the legacy VSB reception system. Because the MPEG-II data supplied to the VSB transmission system 6 is 187 bytes long, the MPEG header inserter 4 places, preferably, three headers in front of each packet (which was 184 bytes) to form a 187 byte long packet identical to the MPEG-II data packet.

The supplemental data having the MPEG header added thereto is provided to a multiplexer 5. The multiplexer 5 receives as inputs the processed supplemental data from the MPEG header inserter 4 and MPEG data packets. MPEG data packet, such as a broadcasting program (movie, sports, entertainment, or drama), coded through another path (preferably an output from an MPEG encoder), is received together with the supplemental data at the multiplexer 5. Upon reception of the MPEG data and the supplemental data, the multiplexer 5 multiplexes the supplemental data and the MPEG data at a fixed ratio in a time division manner in segment units under the control of a controller defining a multiplexing ratio and unit and forwards the multiplexed data to the 8T-VSB transmission system 6. According to the present invention, 313 data segments are combined to make one data field.

The VSB transmission system 6, which is described in detail in reference to FIG. 1B, processes the multiplexed data and transmits the processed data to the VSB reception system through the antenna 7.

The operation of the 8T VSB transmission system 6 will be explained with reference to FIG. 1B. The packets multiplexed in segment units are processed at the VSB transmission system 6. There is a data randomizer 11 in FIG. 1B for making the multiplexed packets random, and a Reed-Solomon coder 12 for subjecting the randomized data to Reed-Solomon coding and adding a parity code of 20 bytes to each of the randomized data packets. The data interleaver 13 interleaves the Reed-Solomon coded packets. The Trellis coder 14 converts the bytes of the interleaved data packets into symbols and subjecting them to Trellis coding.

As described above, the packets are interleaved to provide symbols from one packet to be interleaved into many packets before being forwarded to the Trellis coder 14. There is a multiplexer 15 for multiplexing a symbol stream and for synchronizing signals, and a pilot inserter 16 for adding pilot signals to the symbol streams. There is a VSB modulator 17 for modulating the symbol stream into 8T-VSB signals. There is a RF converter 18 for converting a base band signal, an 8T-VSB signal, into a RF band signal, which is transmitted to the reception system through an antenna 7.

Figure 11:
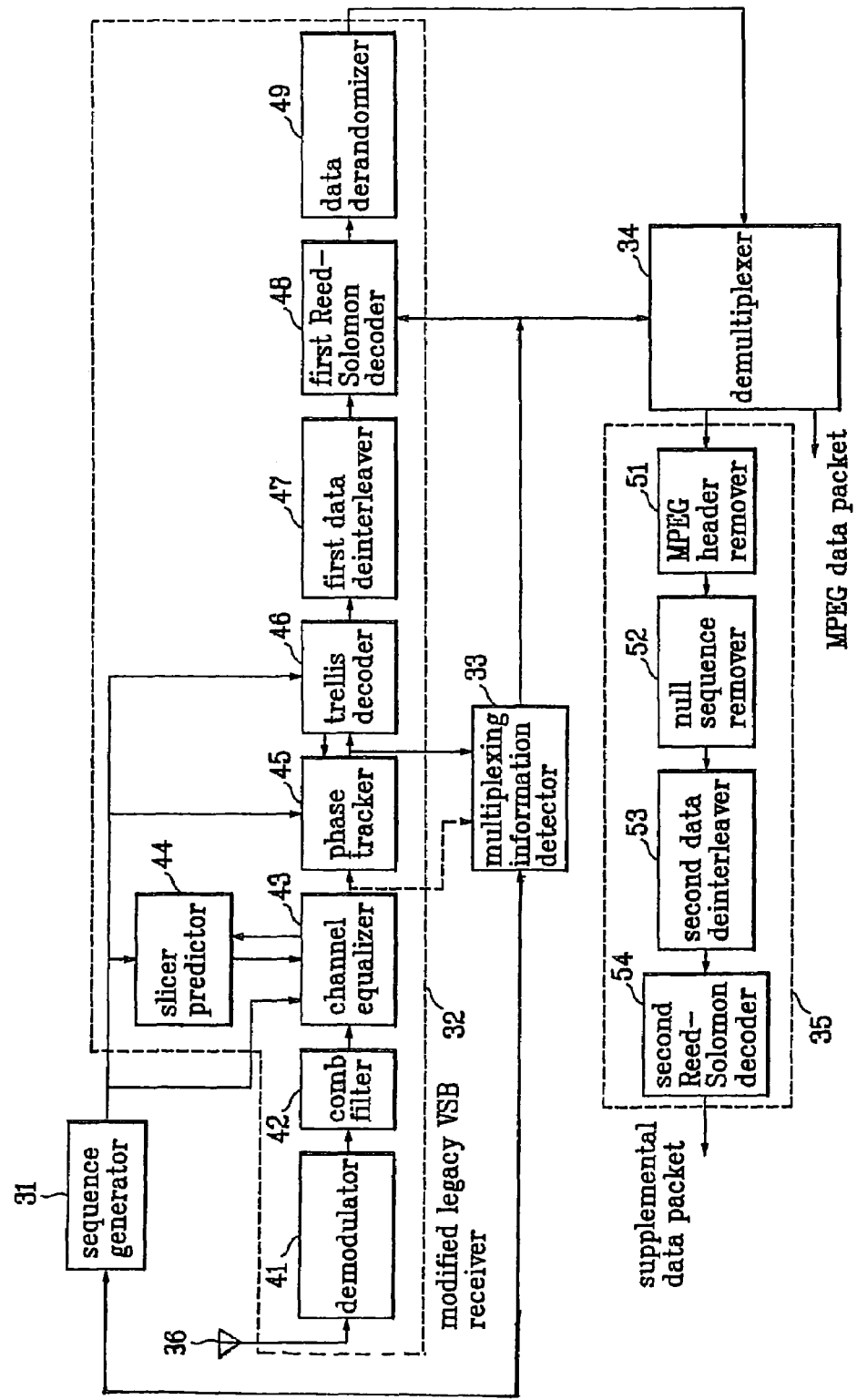
FIG. 11 illustrates a block diagram showing a VSB reception system in a VSB signal communication system of the present invention.

Both a Trellis decoder and a slicer predictor in the digital VSB reception system shown in FIG. 11 use a Viterbi algorithm for estimation of sequence of state transition. An ACS (Accumulate/Compare/Select) part in the Viterbi algorithm calculates metrics of all the possible paths for all states, selects a path with the minimum value (the maximum likelihood), and stores a corresponding metric value. In this instance, a path metric calculated presently is a path metric of a prior time corresponding to the path added with a branch metric. Accordingly, the path metrics calculated up to a prior symbol influence the following symbols.

While a predefined sequence is inserted in the symbols of the supplemental data at the VSB transmission system, no predefined sequence is included in the symbols of the MPEG data. This causes the reliability of an accumulated path metric to be reduced in a symbol section of the MPEG transport data than a symbol section of the supplemental data. Therefore, when the symbols of the MPEG data and the symbols of the supplemental data are mixed, the symbols of the MPEG data give influences to the symbols of the supplemental data. This situation causes the decoding performance of the symbols of the supplemental data to be inferior.

Because the range of the influence is a few symbols, there is a difference (an error rate) of decoding performances between the symbols of the supplemental data in the vicinity of the influence range and the symbols of the supplemental data positioned somewhat away from the influence range. In other words, for the symbols corresponding to the supplemental data, the error rate of the symbols of the supplemental data is higher on a boundary between the symbol section of MPEG transport data and the symbol section of the supplemental data.

Accordingly, in order to maximize the decoding performance of the supplemental data symbols, it is preferable that the supplemental data symbols are transmitted in succession or in large groups. It is required that there is at least a boundary between the symbol section of the MPEG transport data and the symbol section of the supplemental data. The boundary is closely related to the multiplexer, the interleaver, and the Trellis coder.

Figure 2:
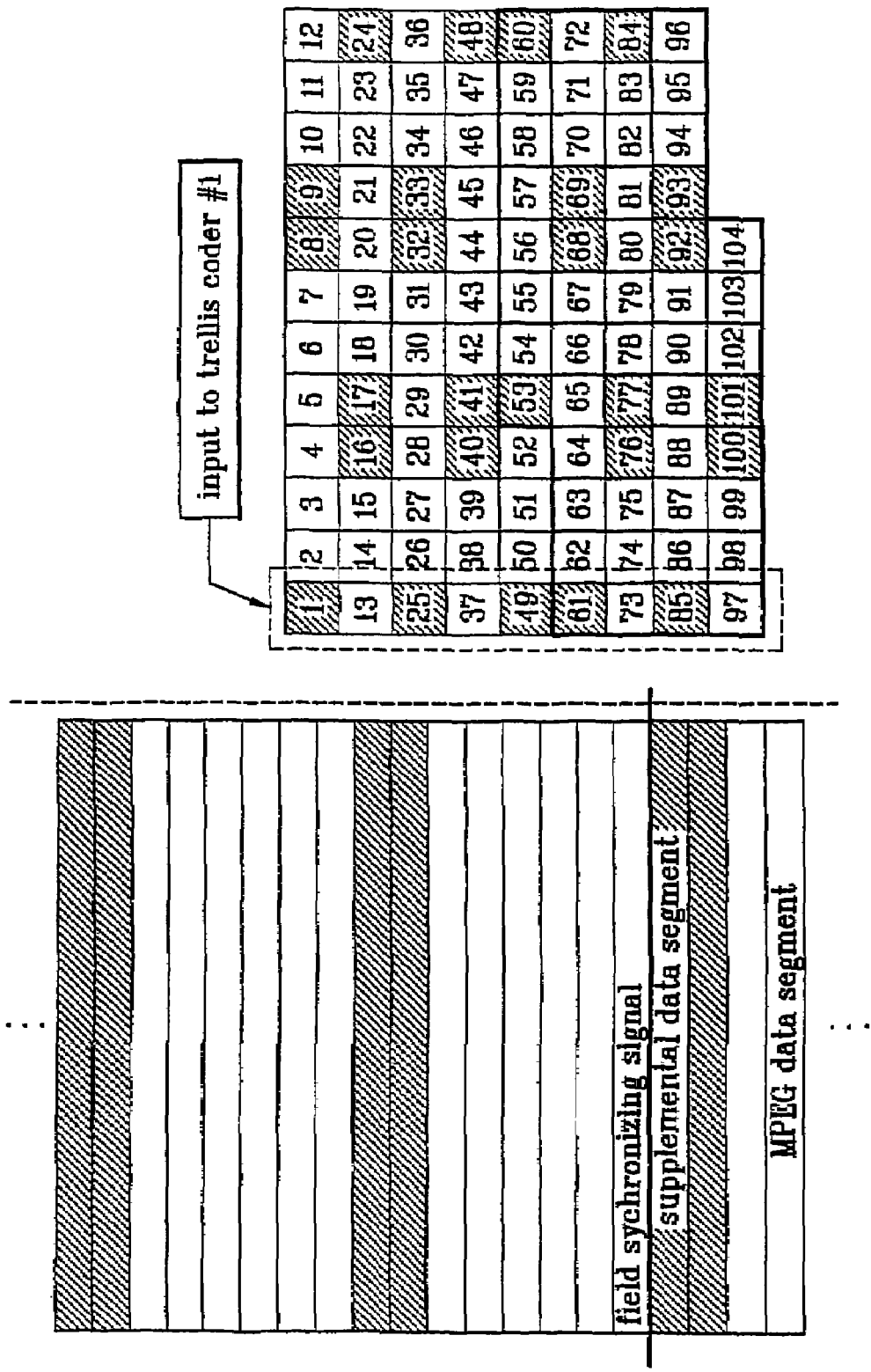
FIG. 2 illustrates a data field diagram in a case where the VSB signal communication system of the present invention has a poor decoding performance.
Figure 9:
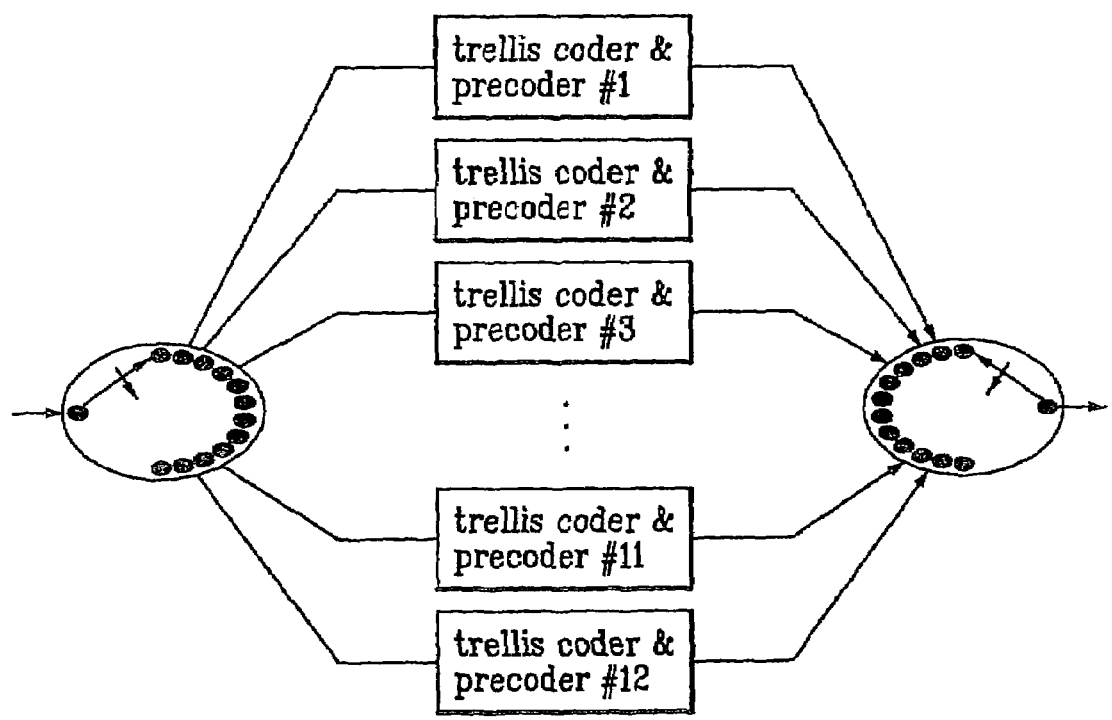
FIG. 9 illustrates a functional diagram showing a Trellis coder of the VSB transmission system.

FIG. 2 illustrates an example of multiplexing the supplemental data and the MPEG data at a multiplexing ratio of 2:6. This is an example where a decoding performance of the supplemental data symbols is less than desirable. The left side diagram illustrates a data field segment diagram in a case when multiplexing is made to include two supplemental data segments and six MPEG segments to form a data field. The right side diagram illustrates the same data field (as the left side diagram) having first 52 bytes and the next 52 bytes provided from the data interleaver 13 to coders in the Trellis coder 14. Preferably, there are 12 coders and precoders in the Trellis coder 14 as shown in FIG. 9. Each column in the right side diagram represents input to each coder in the Trellis coder 14. As can be perceived from the drawing, since the multiplex pattern is not in a 12 byte cycle, bytes of the supplemental data are not grouped on a particular Trellis coder.

Figure 3:
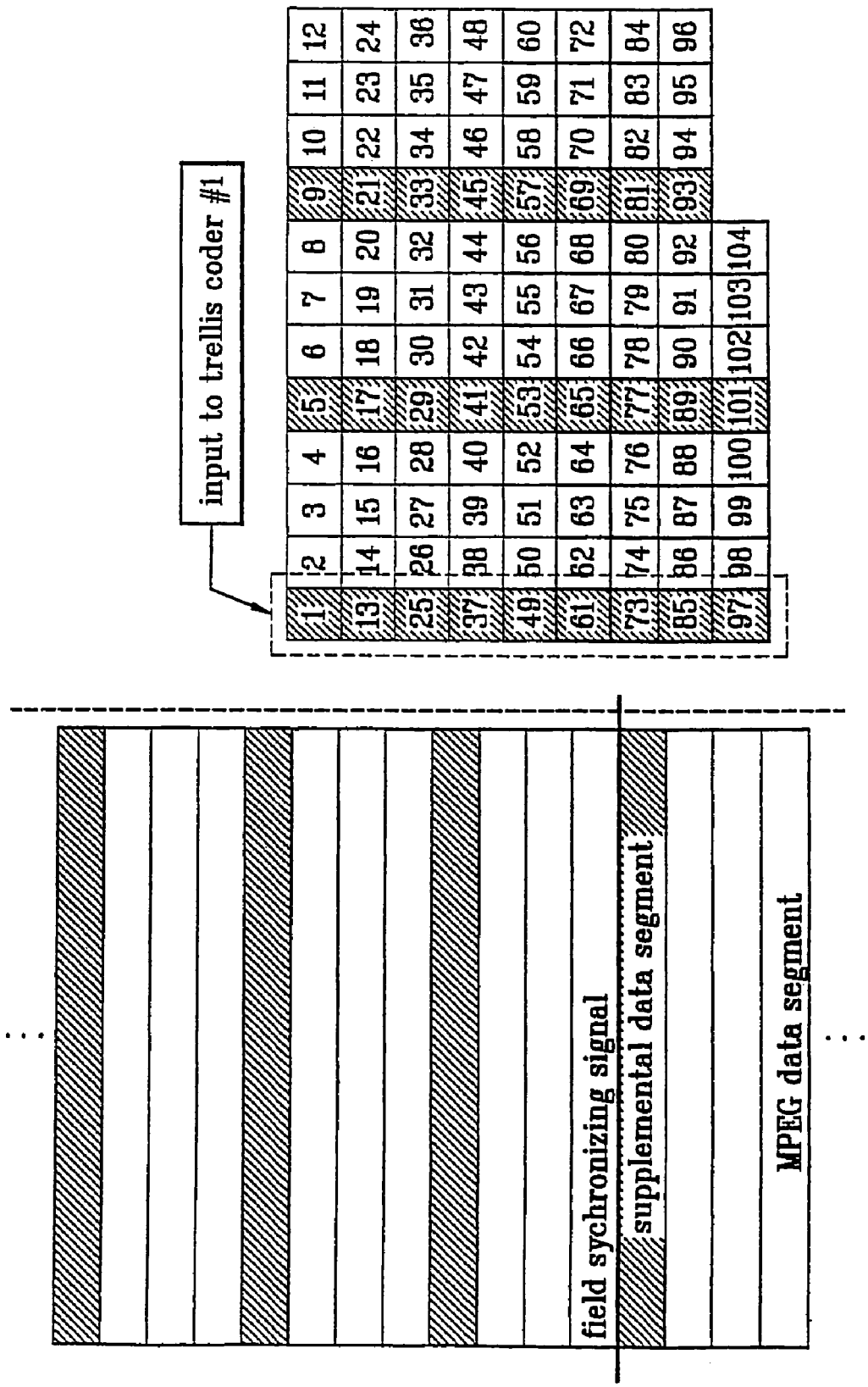
FIG. 3 illustrates a data field diagram in a case where supplemental data and MPEG data are multiplexed in a 1:3 ratio in a VSB signal communication system of the present invention.
Figure 4:
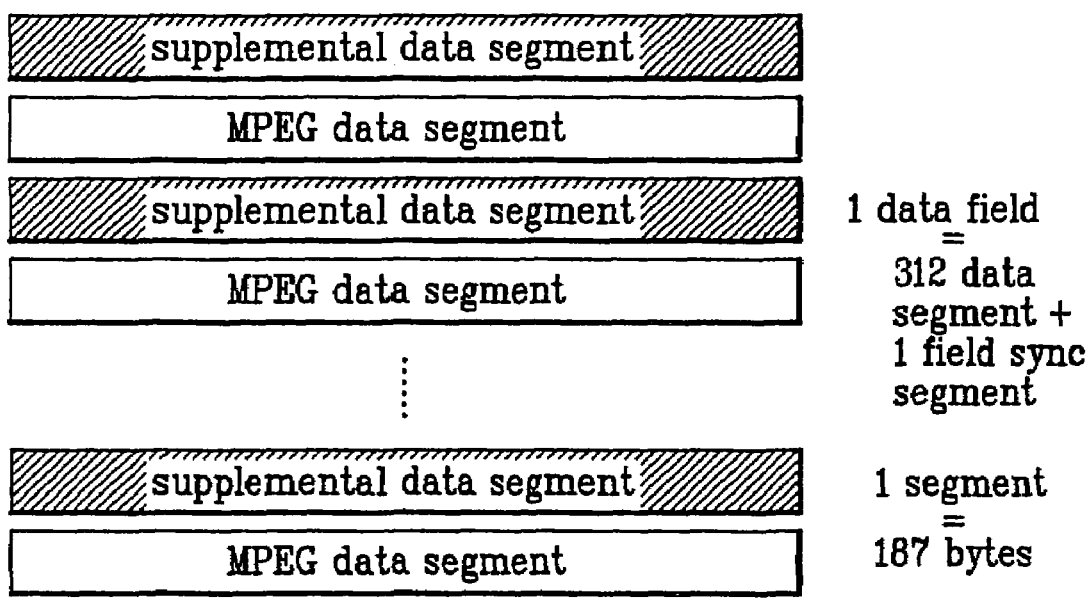
FIG. 4 illustrates a data field diagram in a case where supplemental data and MPEG data are multiplexed in a 1:1 ratio in a VSB signal communication system of the present invention.

FIGS. 3 and 4 illustrate preferred examples of multiplexing. FIG. 3 illustrates a diagram showing an example where the supplemental data and MPEG data are multiplexed in a 1:3 ratio. FIG. 4 illustrates a diagram showing an example where supplemental data and MPEG data are multiplexed in a 1:1 ratio.

A basic principle of multiplexing the supplemental data and the MPEG data according to the preferred embodiment of the present invention will be explained. The principle of multiplexing of the present invention is based on a number of supplemental data packets (denoted as P). When a period of the multiplex pattern for forming a data field is assumed to be 4 segments, a decoding performance of the supplemental data is maximized. One supplemental data packet corresponds to two segments, and 0 to 156 (=312/2) supplemental data packets may be multiplexed in one data field. The supplemental data multiplexed with the MPEG data in a four-segment period are bunched and provided to the Trellis coder 14 through the data interleaver 13.

Using the above information, rules expressed in the following equations may be formulated. A map may be provided by using the following equations for multiplexing the supplemental data segments in the VSB data field. The supplemental data segments are multiplexed in the VSB data field, according to the following equations.

$$0 \leq P \leq 39 : \text{MAP} = \{s | s = ((4i + K1) \bmod 312) + 1, i = 0, 1, \ldots, 2P - 1\} \quad (1)$$

$$40 \leq P \leq 78 : \text{MAP} = \{s | s = ((4i + K1) \bmod 312) + 1, i = 0, 1, \ldots, 77\} U \quad (2)$$
$$\{s | s = ((4i + K2) \bmod 312) + 1, i = 0, 1, \ldots, 2P - 79\}$$

$$79 \leq P \leq 117 : \text{MAP} = \{s | s = ((4i + K1) \bmod 312) + 1, i = 0, 1, \ldots, 77\} U \quad (3)$$
$$\{s | s = ((4i + K2) \bmod 312) + 1, i = 0, 1, \ldots, 77\} U$$
$$\{s | s = ((4i + K3) \bmod 312) + 1, i = 0, 1, \ldots, 2P - 157\}$$

$$118 \leq P \leq 156 : \text{MAP} = \{s | s = ((4i + K1) \bmod 312) + 1, i = 0, 1, \ldots, 77\} U \quad (4)$$
$$\{s | s = ((4i + K2) \bmod 312) + 1, i = 0, 1, \ldots, 77\} U$$
$$\{s | s = ((4i + K3) \bmod 312) + 1, i = 0, 1, \ldots, 77\} U$$
$$\{s | s = ((4i + K4) \bmod 312) + 1, i = 0, 1, \ldots, 2P - 235\}$$

$$1 \leq s \leq 312 \quad (5)$$

$$0 \leq K1, K2, K3, K4 \leq 311 \quad (6)$$

$$(Km \bmod 4) \neq (Kn \bmod 4) \text{ for } m \neq n \quad (7)$$

$$1 \leq m, n \leq 4 \quad (8)$$

In above equations (1) to (8), the 's' indicates a segment position in the data field offset from the field synchronizing signal location and has a value ranging from 1 to 312. The K1, K2, K3, and K4 indicate offsets for adjusting the starting positions for multiplexing the supplemental data segments with reference to the field synchronizing signal, and have a value ranging from 0 to 311. (Km mod 4) and (Kn mod 4) have different values for different values of 'm' and 'n'.

The above equations may be summarized such that, in a case where a number of the supplemental data segments to be multiplexed in one data field is smaller than ¼ of 312 segments ($0 \leq P \leq 39$), a position of the supplemental data segment is assigned to every fourth segment of the data field, starting from a particular position of the data field.

Where the number of the supplemental data segments to be multiplexed in one data field is greater than ¼ of 312 bytes but smaller than ½ of 312 ($40 \leq P \leq 78$), a position of the supplemental data segment is assigned to every fourth segment of the data field starting from a particular position of the data field. Then, for rest of the supplemental data segments, a position of the supplemental data segment is assigned to every fourth segment of the data field starting from another particular position of the data field.

Where the number of the supplemental data segments to be multiplexed in one data field is greater than ½ of 312 bytes but smaller than ¾ of 312 ($79 \leq P \leq 117$), a position of the supplemental data segment is assigned to every fourth segment of the data field starting from a particular position of the data field for ½ of the positions of the supplemental data segments to be multiplexed. Then, for the rest of the supplemental data segments, a position of the supplemental data segment is assigned to every fourth segment of the data field starting from another particular position of the data field, i.e., taking a different starting position of multiplexing the supplemental data.

Where the number of the supplemental data segments to be multiplexed in one data field is greater than ¾ of 312 bytes but smaller than 1 ($118 \leq P \leq 156$), a position of the supplemental data segment is assigned to every fourth segment of the data field starting from a particular position of the data field for ¾ of the positions of the supplemental data segments to be multiplexed. Then, for the rest of the supplemental data segments, a position of the supplemental data segment is assigned to every fourth segment of the data field starting from another particular position of the data field, i.e., taking a different starting position of multiplexing the supplemental data.

In equations (1) to (8), the offset values K1, K2, K3, and K4 are set to be in a range of '0' to 311, to generalize the starting position of multiplexing the supplemental data segments in the data field. If the four offset values K1, K2, K3, and K4 are fixed and used in the VSB communication system, the values are not required to be included in the multiplexing information.

Figure 5A:
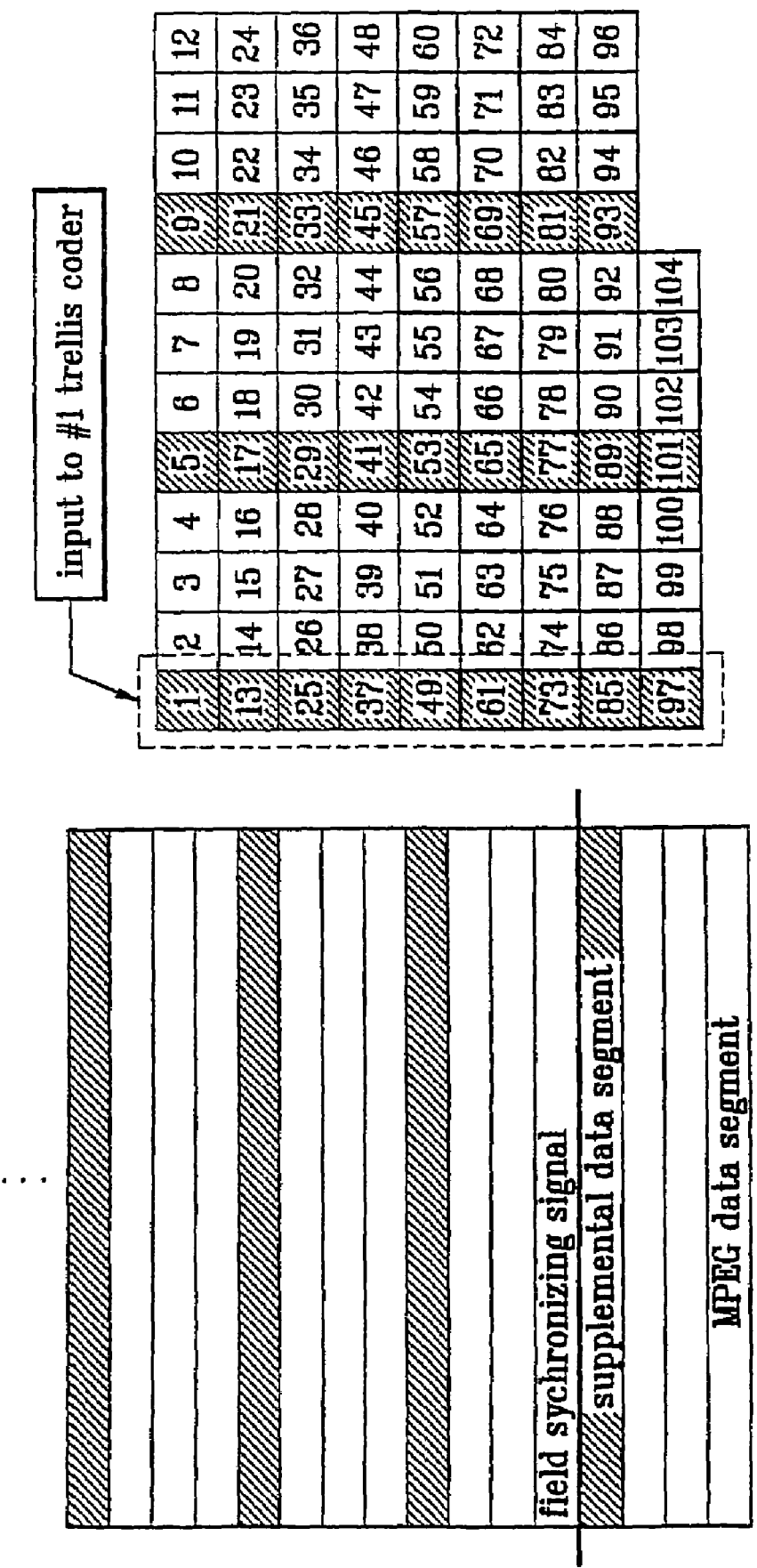
FIG. 5A illustrates a multiplexed data field diagram when the supplemental data segments and the MPEG data segments are multiplexed in a 1:3 ratio with the offset K1 set to '0'.
Figure 5B:
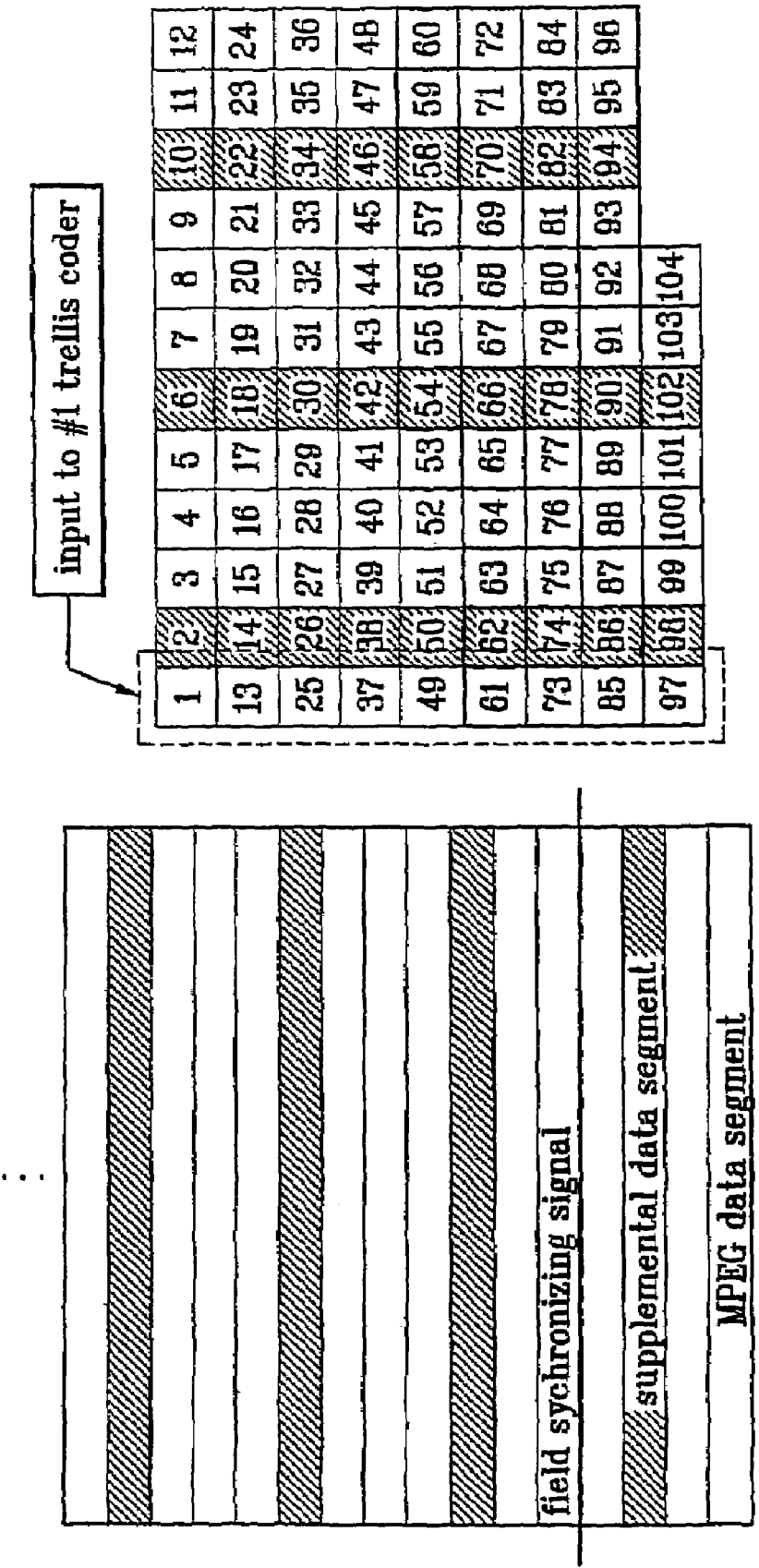
FIG. 5B illustrates a multiplexed data field diagram when the supplemental data segments and the MPEG data segments are multiplexed in a 1:3 ratio with the offset K1 set to '1'.
Figure 5C:
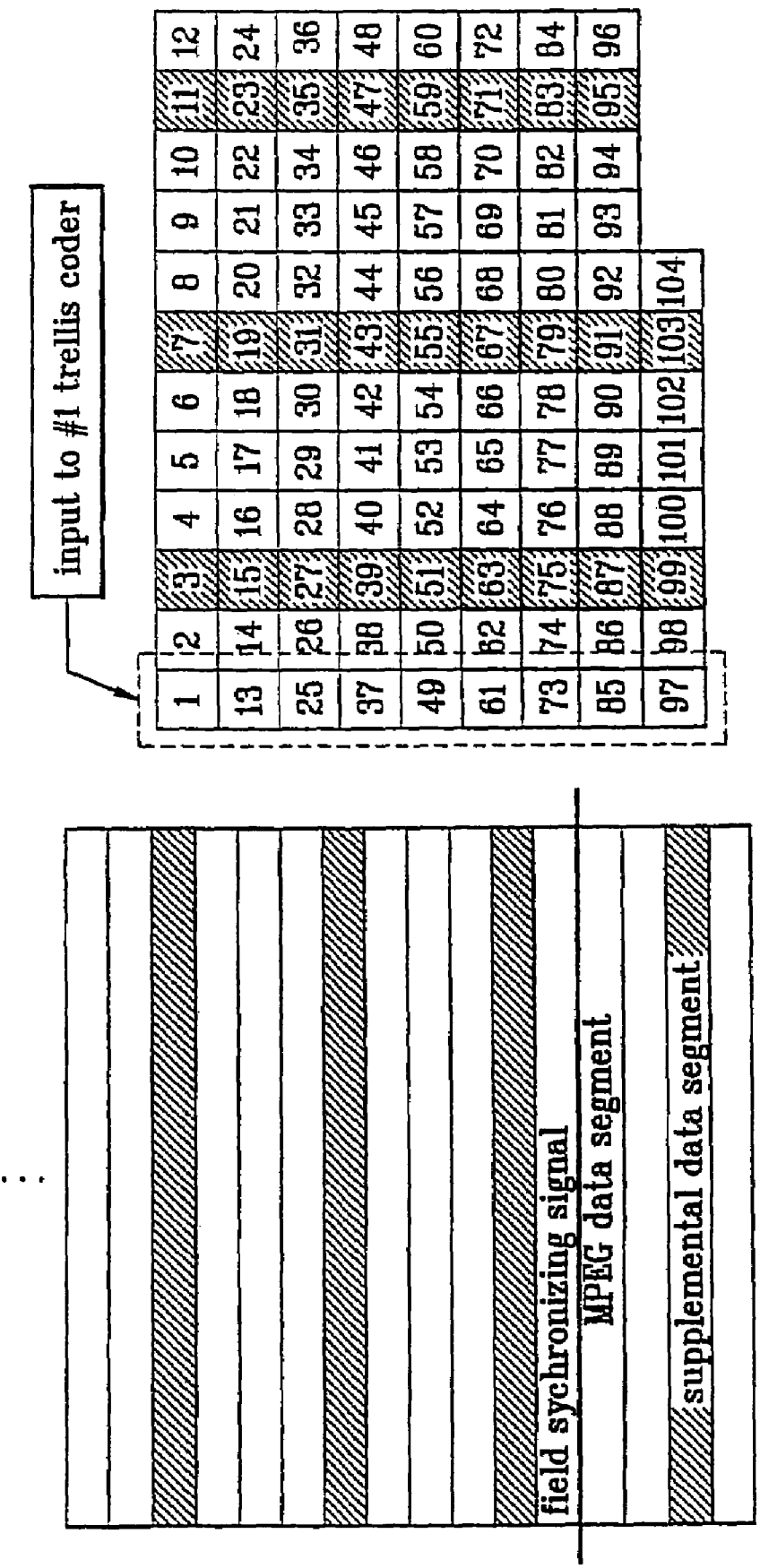
FIG. 5C illustrates a multiplexed data field diagram when the supplemental data segments and the MPEG data segments are multiplexed in a 1:3 ratio with the offset K1 set to '2'.
Figure 5D:
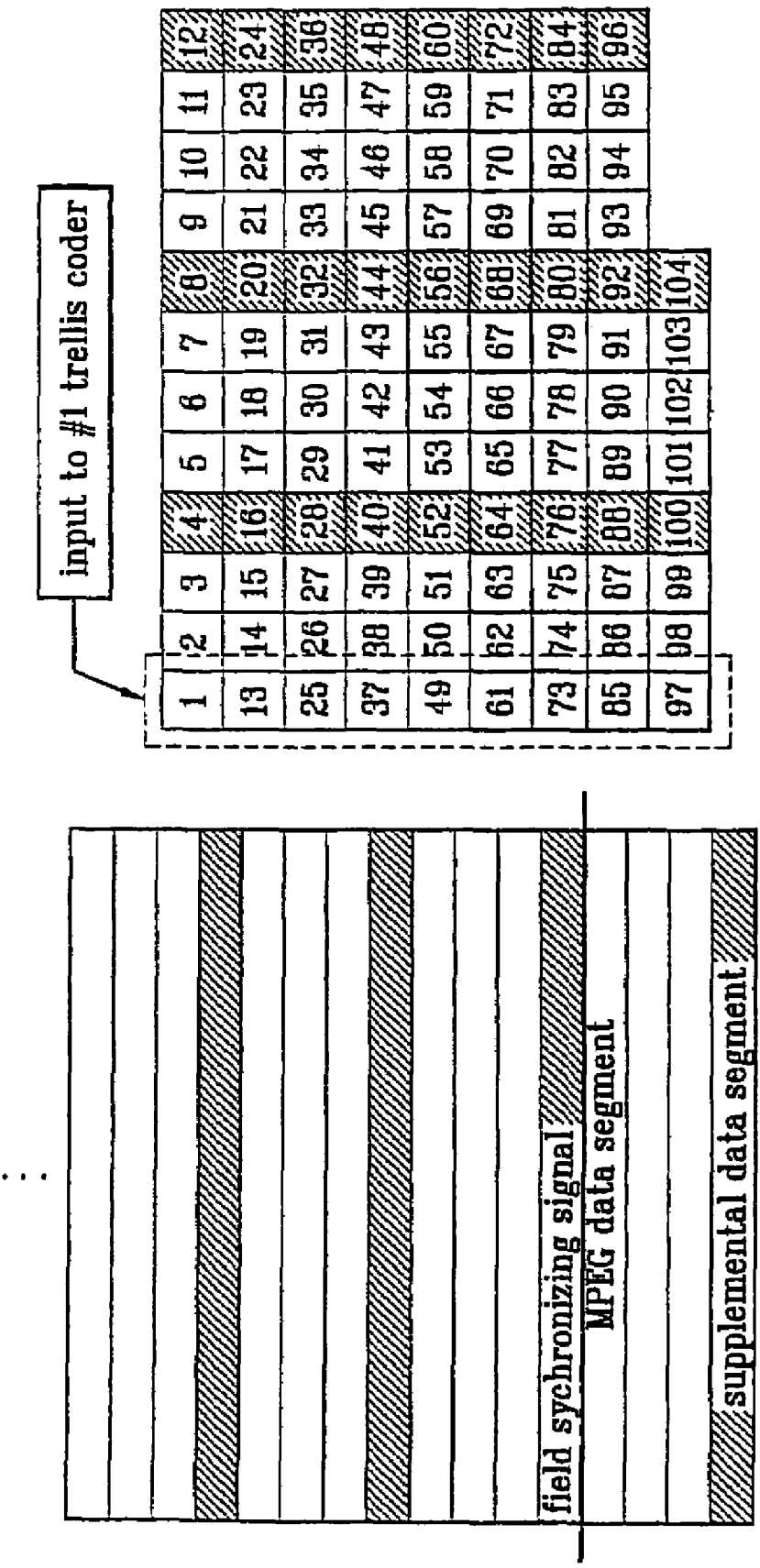
FIG. 5D illustrates a multiplexed data field diagram when the supplemental data segments and the MPEG data segments are multiplexed in a 1:3 ratio with the offset K1 set to '3'.

Examples of multiplexing the MPEG segments and the extra segments according to equations (1) to (8) will be explained with reference to the drawings. FIG. 5A illustrates a diagram showing a multiplexed data field when the supplemental data segments and the MPEG data segments are multiplexed in a 1:3 ratio with the offset K1 set to '0'. FIG. 5B illustrates a diagram showing a multiplexed data field when the supplemental data segments and the MPEG data segments are multiplexed in a 1:3 ratio with the offset K1 set to '1'. FIG. 5C illustrates a diagram showing a multiplexed data field when the supplemental data segments and the MPEG data segments are multiplexed in a 1:3 ratio with the offset K1 set to '2'. FIG. 5D illustrates a diagram showing a multiplexed data field when the supplemental data segments and the MPEG data segments are multiplexed a 1:3 ratio with the offset K1 set to '3'. FIGS. 5A to 5D correspond to an example where the number 'P' of supplemental data packets are 39.

In each figure, a diagram on the left side illustrates a form of multiplexing the supplemental data segments and the MPEG data segments with reference to the field synchronizing signal. A diagram on the right side illustrates a form of an output signal of the interleaver as provided to twelve Trellis coders residing in the Trellis coder 14, respectively.

FIG. 5A illustrates data field and trellis coder input diagrams showing the supplemental data segment being multiplexed for every fourth data field segments starting from a first segment of the data field with reference to the field synchronizing signal. The diagram on the right side illustrates the first 52 bytes of supplemental data and the second 52 bytes of supplemental data from the interleaver being provided to 12 Trellis coders next to the field synchronizing signal. That is, the first 52 bytes of supplemental data are provided to the 12 Trellis coders by 12 bytes over four times (48 bytes), leaving four bytes among the 52 bytes. The four remaining bytes are provided to the 12 Trellis coders together with the first 8 bytes of the second 52 bytes.

According to the multiplexing pattern of the supplemental data expressed in equations (1) to (8), the four remaining bytes among the first 52 bytes maintain a fixed multiplexing pattern with the first 8 bytes among the second 52 bytes. This implies that bytes of the supplemental data are grouped to a particular coder or coders among the twelve Trellis coders. The multiplexing of the supplemental data with the bytes group to a particular coder or coders enhances the decoding performance of the supplemental data at the VSB reception system.

FIG. 5B illustrates data field and trellis coder input diagrams showing the supplemental data segment being multiplexed starting from a second segment of the data field with reference to the field synchronizing signal. FIG. 5C illustrates a diagram showing the supplemental data segment being multiplexed starting from a third segment of the data field with reference to the field synchronizing signal. FIG. 5D illustrates a diagram showing the supplemental data segment being multiplexed starting from a fourth segment of the data field with reference to the field synchronizing signal. The cases of FIG. 5B to 5D are identical to the case of FIG. 5A in that one supplemental data segment is multiplexed for every four segments of the data field, and bytes of the supplemental data are grouped in a particular coder or coders.

Figure 6A:
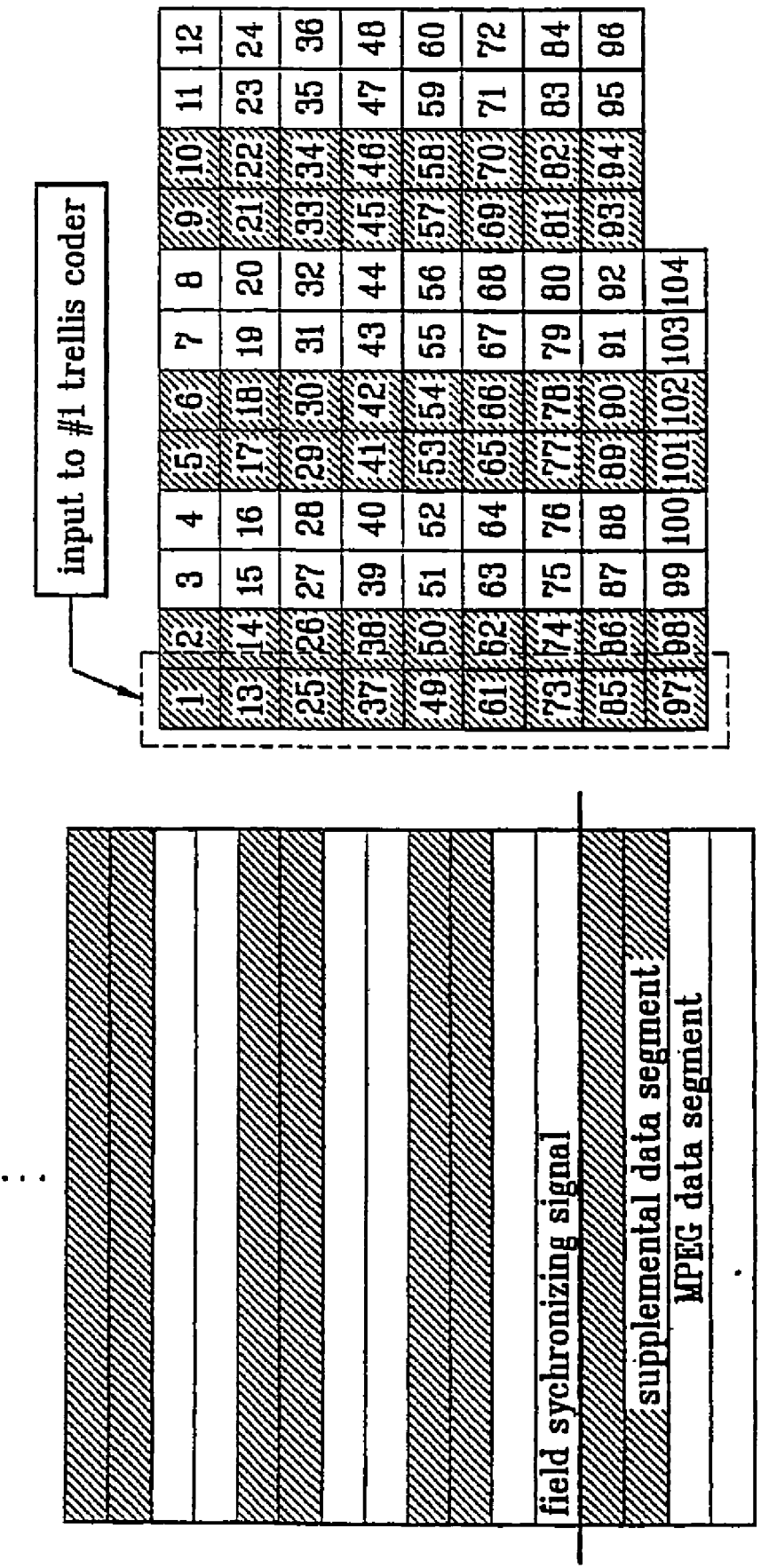
FIG. 6A illustrates a multiplexed data field diagram when the supplemental data segments and the MPEG data segments are multiplexed in a 1:1 ratio with the offset K1 set to '0' and the offset K2 set to 1.
Figure 6B:
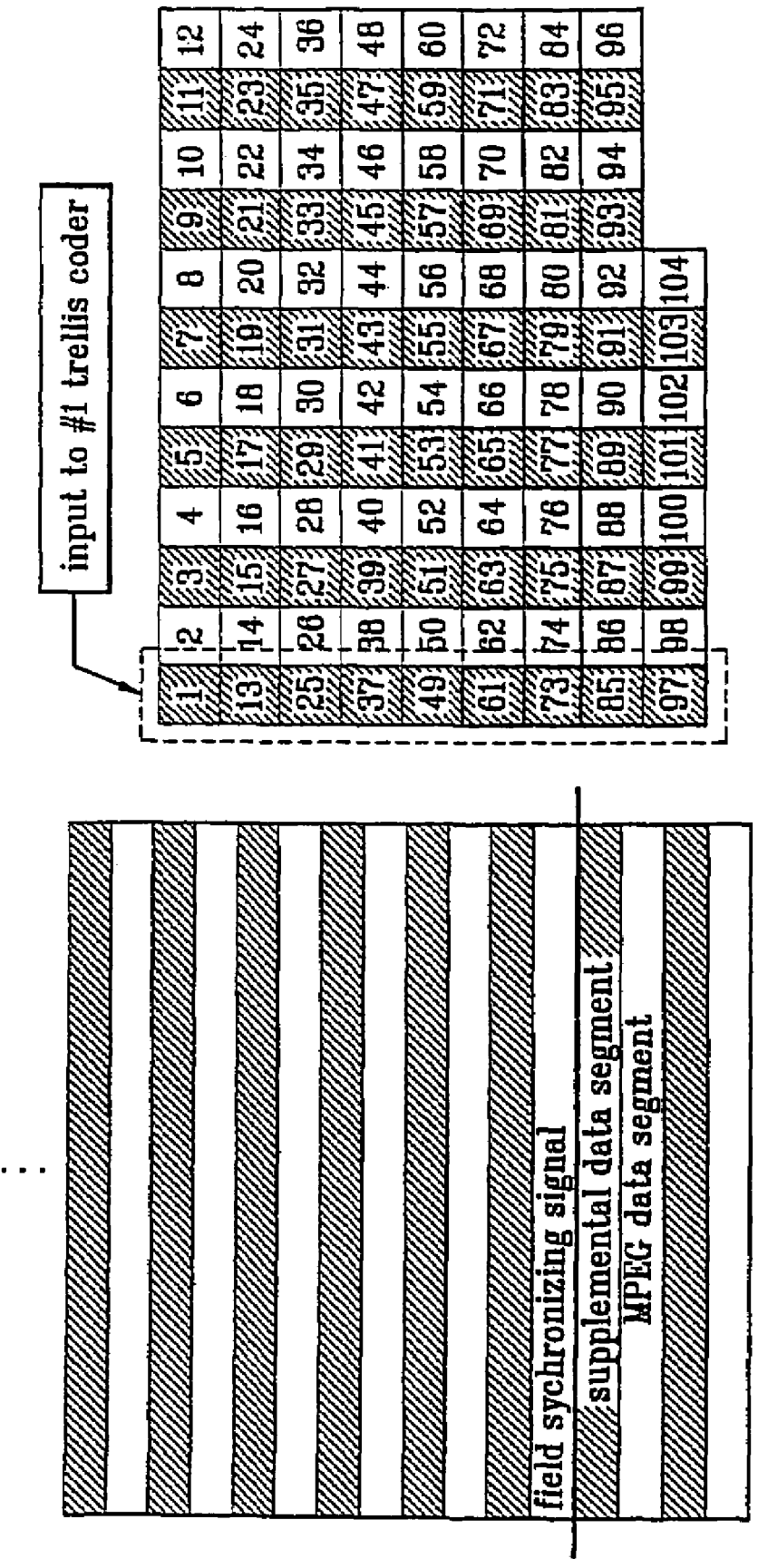
FIG. 6B illustrates a multiplexed data field diagram when the supplemental data segments and the MPEG data segments are multiplexed in a 1:1 ratio with the offset K1 set to '0' and the offset K2 set to 2.

Cases where the supplemental data segments and the MPEG data segments are multiplexed in a ratio of 1:1 by using equations (1) to (8) will be explained. FIG. 6A illustrates a diagram showing a multiplexed data field when the supplemental data segments and the MPEG data segments (or MPEG transport segments) are multiplexed in a 1:1 ratio with the offset K1 set to '0' and the offset K2 set to 1. FIG. 6B illustrates a diagram showing a multiplexed data field when the supplemental data segments and the MPEG data segments (or MPEG transport segments) are multiplexed in a 1:1 ratio with the offset K1 set to '0' and the offset K2 set to 2.

Referring to FIGS. 6A and 6B, it can be seen that the following situation occurs in the multiplexed data field. FIGS. 5A to 5D illustrate examples where the MPEG data segments (or the MPEG transport segments) are multiplexed in a 1:3 ratio. In this instance, the supplemental data bytes are grouped to a particular coder or coders even if the starting positions of the supplemental data multiplexing differ with reference to the field synchronizing signal. Therefore, by a combination of any two cases of FIGS. 5A to 5D, a characteristic identical to the case when the MPEG data segments (or the MPEG transport segments) are multiplexed in a 1:3 ratio can be maintained even if the MPEG data segments (or the MPEG transport segments) are multiplexed in a 1:1 ratio.

For an example, if the cases of FIGS. 5A and 5B are combined, the supplemental data bytes are grouped to a particular Trellis coder as shown in FIG. 6A. If the cases of FIGS. 5A and 5C are combined, the supplemental data bytes are bunched to a particular Trellis coder as shown in FIG. 6B.

Equations (9) to (12) are a summary of methods for multiplexing the MPEG data segments (or MPEG transport segments) and the supplemental data segments according to the number of the supplemental data packets when the offset values K1, K2, K3, and K4 in the equations (1) to (8) are fixed to 0, 2, 1, and 3 respectively. P denotes a number of supplemental data packets to be multiplexed in one data field. MAP denotes a set of locations the supplemental data are multiplexed in one data field.

Preferably, the P value is divided into four regions, and the supplemental data and the MPEG transport data in each region are multiplexed differently. In equations 9 to 12, an element 's' in a set represents a segment position in a data field from the location of the field synchronizing signal. Once 'P' is fixed, then the MAP is determined. Then the supplemental data segments are multiplexed with the MPEG transport data in an order of the 's' in the MAP.

$$0 \leq P \leq 39: \text{MAP} = \{s|s = 4i + 1, i = 0, 1, \ldots, 2P - 1\}, (1 \leq s \leq 312) \quad (9)$$

$$40 \leq P \leq 78: \text{MAP} = \{s|s = 4i + 1, i = 0, 1, \ldots, 77\} U \quad (10)$$
$$\{s|s = 4i + 3, i = 0, 1, \ldots, 2P - 79\}, (1 \leq s \leq 312)$$

$$79 \leq P \leq 117: \text{MAP} = \{s|s = 4i + 1, i = 0, 1, \ldots, 77\} U \quad (11)$$
$$\{s|s = 4i + 3, i = 0, 1, \ldots, 77\} U$$
$$\{s|s = 4i + 2, i = 0, 1, \ldots, 2P - 157\}, (1 \leq s \leq 312)$$

$$118 \leq P \leq 156: \text{MAP} = \{s|s = 4i + 1, i = 0, 1, \ldots, 77\} U \quad (12)$$
$$\{s|s = 4i + 3, i = 0, 1, \ldots, 77\} U$$
$$\{s|s = 4i + 2, i = 0, 1, \ldots, 77\} U$$
$$\{s|s = 4i + 4, i = 0, 1, \ldots, 2P - 235\}, (1 \leq s \leq 312)$$

As explained above, FIG. 3 illustrates a case when the supplemental data and the MPEG data are multiplexed at a 1:3 ratio, where equation (9) is applicable corresponding to a case where 'P' falls in the range $0 \leq P \leq 39$. FIG. 4 illustrates a case when the supplemental data and the MPEG data are multiplexed at a 1:1 ratio, where equation (10) is applicable in the case where 'P' falls between $40 \leq P \leq 78$. The data multiplexed according to the foregoing methods is processed through the data interleaver 13 and the Trellis coder 14 in the 8T VSB transmission system 6.

Figure 7:
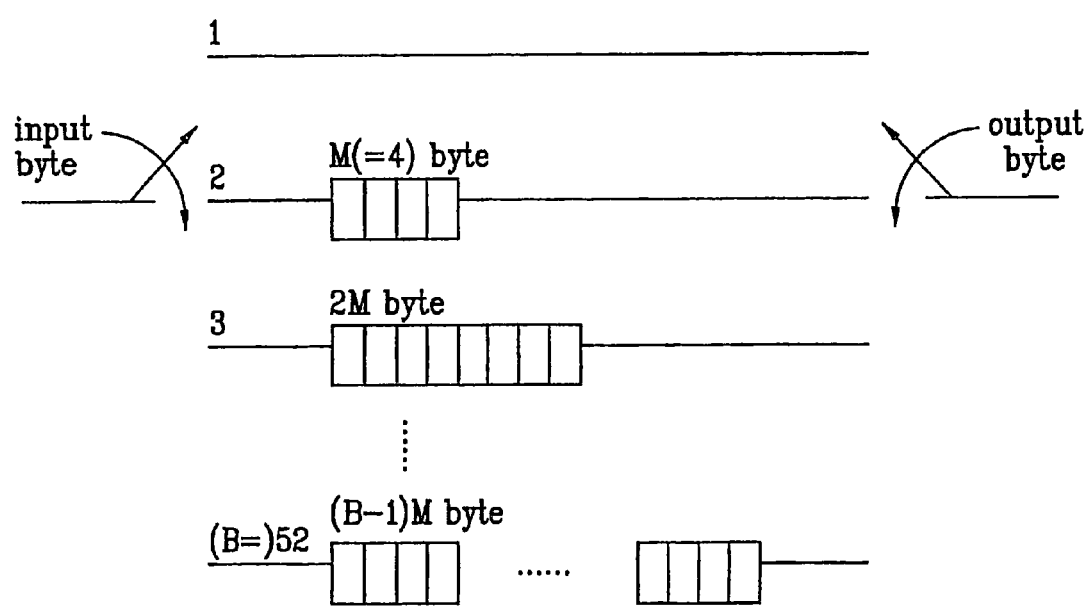
FIG. 7 illustrates a functional diagram of a data interleaver of the VSB transmission system.
Figure 8:
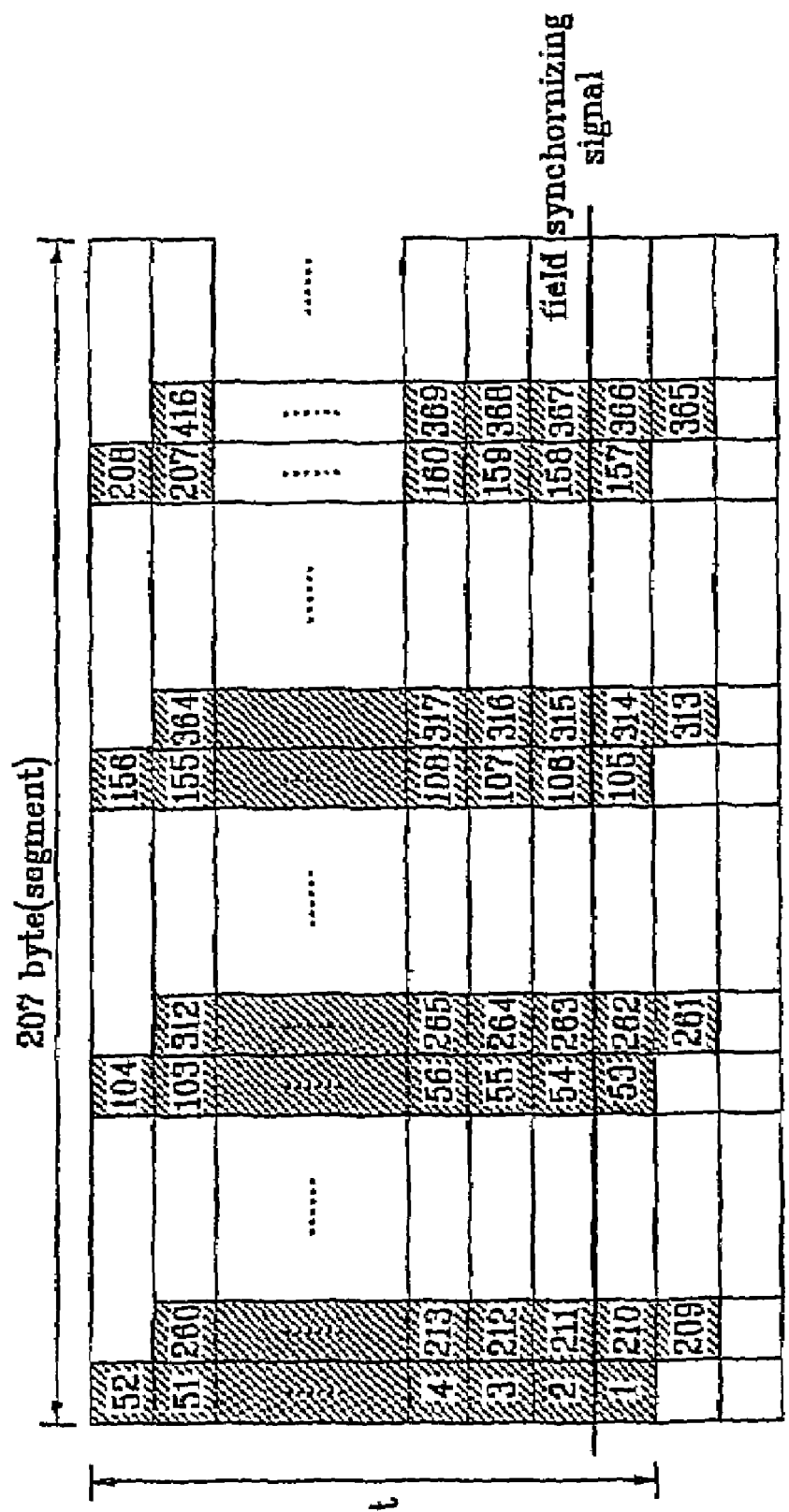
FIG. 8 illustrates a diagram showing data input/output of the data interleaver.

FIG. 7 illustrates a diagram showing a data interleaver. FIG. 8 illustrates a diagram showing data input/output orders of the data interleaver in FIG. 7. FIG. 9 illustrates a functional diagram of a Trellis coder, when the 8T VSB transmission system transmits the multiplexed data in succession for making the supplemental data decoding performance to be at a maximum level. The process for multiplexing the supplemental data and the MPEG data in 1:3 will be explained in detail, with reference to FIGS. 7 to 9.

As stated above, FIG. 7 illustrates the data interleaver in the VSB transmission system, where a convolutional interleaver has B branches where B is preferably 52 and M bytes of unit memories, where M is preferably 4. As shown in FIG. 7, the interleaver is operative synchronous to a first byte of one data field. The first byte is received and directly forwarded through the first branch, and a second byte is received through the second branch and a value 52×4 bytes prior to the second byte is forwarded.

FIG. 8 illustrates a diagram showing input/output orders of the data interleaver in FIG. 7. In FIG. 8, the data is received from an upper side to a lower side of the data field in segment units, and bytes in each segment are received from left to right. Numerals in FIG. 8 represent the forwarding order of the interleaver shown in FIG. 7. The first byte of the data field next to a field synchronizing signal is received at the first branch in FIG. 7 and forwarded directly as is. The first byte corresponds to a numeral '1' in FIG. 8. The next byte is received at the second branch of the interleaver.

As shown in FIG. 7, the interleaver forwards a byte received 52×4 (M)=208 bytes prior to the next byte, to forward a byte corresponding to a numeral 2 as shown in FIG. 8. Upon reception of the next byte, the interleaver forwards a byte 52×8 (2M)=416 bytes prior to the received byte, to forward a byte corresponding to a numeral 3 as shown in FIG. 8. According to the foregoing method, 52 bytes from the interleaver are forwarded to the 12 Trellis coders and precoders (shown in FIG. 9) in succession. A 53rd byte is received at the first branch of the interleaver and directly forwarded. The interleaver is operative in a 52 segment depth, and connected to the 12 Trellis coders and precoders. Therefore, the 52 bytes from the interleaver are forwarded to the Trellis coders and the precoders by 12 bytes in a cycle period of four times.

In this instance, when the process is carried out for four times, only 48 bytes (12 bytes×4 times=48) are forwarded to the Trellis coders and the precoders, leaving 4 bytes. The remaining 4 bytes are forwarded to the 12 Trellis coders and the precoders together with first 8 bytes of the next 52 bytes. Therefore, multiplexing the supplemental data and MPEG transport data segments with a period of 4 maximizes bunching the supplemental data symbols into Trellis coders.

FIG. 9 illustrates a functional diagram of a Trellis coder 14 used in the VSB transmission system 6 of the present invention. The inputs and outputs to the twelve (12) Trellis coders and the precoders are multiplexed. As shown in FIG. 9, the 12 bytes form the interleaver provided to the 12 Trellis coders and the precoders by one byte, when each of the bytes are subjected to Trellis coding, to produce 4 symbols (each symbol has two bits). The symbols from each of the Trellis coders are multiplexed by one symbol before the symbols are forwarded.

Figure 10:
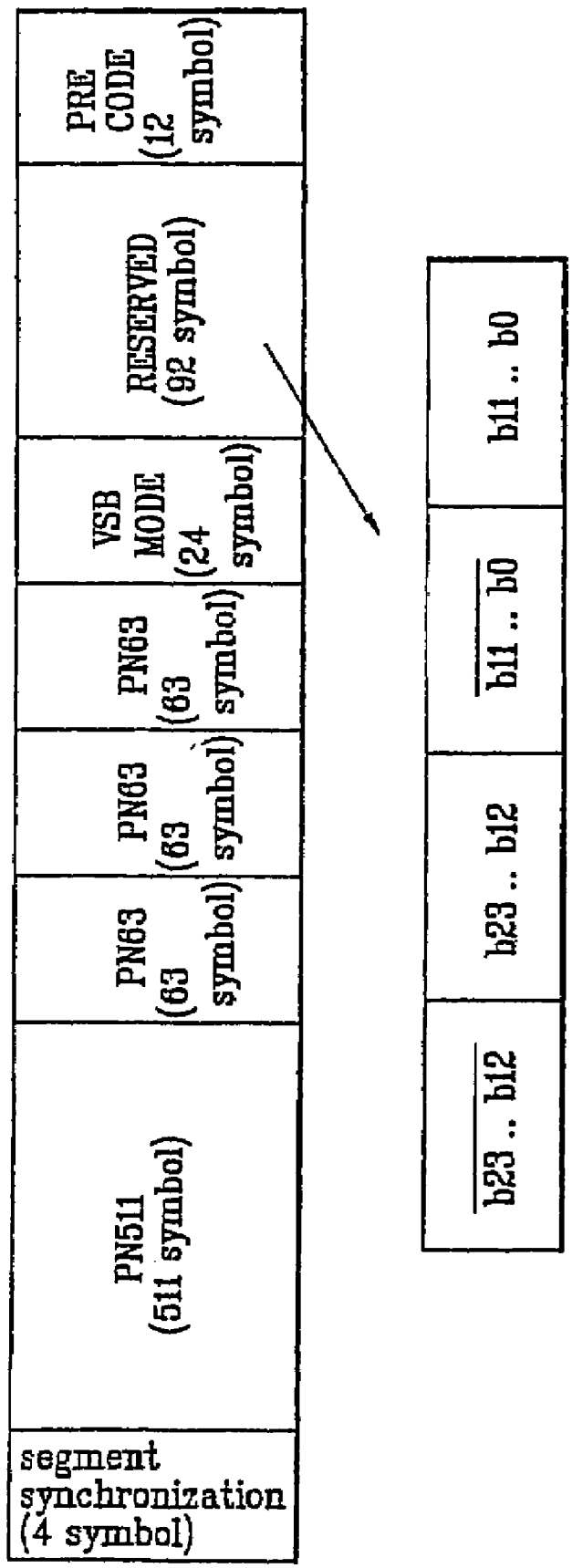
FIG. 10 illustrates a segment structure of a field synchronizing signal segment of a data field according to the preferred embodiment of the present invention.

FIG. 10 illustrates a segment structure of a field synchronizing signal segment in a data field of the VSB transmission system of the present invention. In FIG. 10, the segment of the field synchronizing signal contains the multiplexing information to be used by the VSB reception system. The VSB reception system detects the multiplexing information in the segment containing the field synchronizing signal and performs the correct decoding by using the multiplexed information.

As explained, once the number 'P' (0 to 156) of the supplemental data packets is fixed, the multiplexed positions of the supplemental data are fixed in the data field. The VSB transmission system then transmits only a 'P' value to the VSB reception system.

For facilitating a quantity change of the supplemental data to be multiplexed even if it is in the middle of transmission of data from the VSB transmission system to the VSB reception system, the VSB transmission system transmits the current 'P' value, a number of data fields until the present 'P' value is changed (i.e, a count down value until the P value change occurs), and a 'P' value to be changed in the reserved area of the field synchronizing signal segment shown in FIG. 10 to the VSB reception system.

Accordingly, the VSB reception system receives data without any error from the VSB transmission system, even if the 'P' value is changed. The multiplexing information is contained in the reserved area of the field synchronizing signal.

As shown in FIG. 10, of the total 832 symbols of the field synchronizing signal segment, 92 symbols are assigned to the reserved area. For example, the multiplexing information transmitted through the reserved area is as follows. 8 bits may be assigned to the current 'P' value, another 8 bits are assigned to the 'P' value to be changed, and another 8 bits are assigned to a number of fields until the current 'P' value is changed to a next 'P' value. Therefore, a total of 24 bits of the multiplexing information is transmitted to the VSB reception system using the reserved area. If the count down value until change is '0', it implies that the current 'P' value will not be changed for the time being. At this time, the next P value is the same with the current P value.

Even in a case when comb filtering is carried out in the VSB reception system due to the interference from an NTSC broadcasting signal, the present broadcasting type, detection of the multiplexing information is required. To accommodate for such situation, the entire 24 bits of multiplexing information is preferably divided into two 12 bit pieces of information, where one of the two pieces of 12 bit information has a form inverted with respect to the other. That is, one piece of 12 bit information is transmitted to the VSB reception system, together with another piece of 12 bit information inverted to the first piece of 12 bit information.

As shown in FIG. 10, the 24-bit multiplexing information is divided into two 12-bit sections of information. The first 12-bit section and the second 12-bit section are inverse of each other and occupy the reserved area. Preferably, the inversion is a bit-wise-inversion.

For more stable transmission of the multiplexing information from the VSB transmission system to the VSB reception system under a poor channel situation (in a form that the multiplexing information is included to a first supplemental data segment next to the field synchronizing signal), the multiplexing information may be transmitted to the VSB reception system as part of the supplemental data segment.

FIG. 11 illustrates a block diagram of a digital VSB reception system 300 in accordance with a preferred embodiment of the present invention, which improves reception performance by using a predefined sequence and receives supplemental data transmitted by the VSB transmitter.

In FIG. 11, the VSB reception system 300 of the present invention includes a sequence generator 31 for indicating a symbol of the supplemental data and generating a predefined sequence included in the supplemental data, a modified legacy VSB receiver 32 for processing the data received from the VSB transmitter 110 (shown in FIG. 1A) in a reverse order of the VSB transmission system. The VSB reception system 300 further includes a demultiplexer 34 for demultiplexing the data from the modified legacy VSB receiver 32 into the MPEG data (also known as data segment) and the supplemental data (also known as data segment), and a supplemental data decoder 35 for processing the supplemental data segment from the demultiplexer 34 in reverse order of the transmission system, to obtain the original supplemental data.

As shown in FIG. 11, the modified legacy VSB receiver 32 includes a demodulator 41, a comb filter 42, a channel equalizer 43, a slicer predictor 44, a phase tracker 45, a Trellis decoder 46, a first data deinterleaver 47, a first Reed-Solomon decoder 48, and a data de-randomizer 49. The supplemental data decoder 35 includes an MPEG header remover 51, a null sequence remover 52, a second data deinterleaver 53, and a second Reed-Solomon decoder 54.

According to the preferred embodiment, the demodulator 41 converts a RF band signal into a base band signal, and the synchronizing and timing recovery system recovers a segment synchronizing signal, a field synchronizing signal, and a symbol timing. The comb filter 42 removes an NTSC interference signal, if detected, and the channel equalizer 43 corrects a distorted channel by using the slicer predictor 44.

The phase tracker 45 corrects a rotated phase, and the Trellis decoder 46 undertakes Viterbi decoding by using the generated sequence and the Viterbi algorithm. The channel equalizer 43, the slicer predictor 44, the phase tracker 45, and the Trellis decoder 46 process the received symbols by using the sequence generated at the sequence generator 31.

The first data deinterleaver 47 acts in reverse of the action of the data interleaver in the ATSC 8T VSB transmission system. The first Reed-Solomon decoder 48 again decodes a signal Reed-Solomon coded at the ATSC 8T VSB transmission system. The data derandomizer 49 acts m reverse of the action of the data randomizer in the transmission system.

According to the preferred embodiment of the present invention the sequence generator 31 decodes the symbol received from the VSB transmission system corresponding to the supplemental data, and generates a sequence identical to the predefined sequence that is inserted and transmitted in the supplemental data.

As described above, the channel equalizer 43, the slicer predictor 44, the phase tracker 45, and the Trellis decoder 46 improve signal processing performances by using the predefined sequence. This occurs when the components using the predefined sequence use the sequence information with the delayed sequence information, taking the delay in data processing at prior components into account.

In the VSB reception system 300, the demultiplexer 34 demultiplexes the data from the modified legacy VSB receiver 32 into a supplemental data segment and an MPEG data segment by using the multiplexing information detected from, for example, the field synchronizing signal. In the preferred embodiment the first Reed-Solomon decoder 54 makes no Reed-Solomon decoding of the supplemental data segment, but only removes the 20 byte parity added at the Reed-Solomon coder in the VSB transmission system.

If the channel noise is excessive, many errors are present in the parity bytes of the Reed-Solomon code compared to the supplemental data because the parity bytes of the ATSC Reed-Solomon code has no predefined sequence inserted, resulting in no gain at the Trellis decoder 46. The first Reed-Solomon decoder 48 makes no Reed-Solomon decoding of the supplemental data segment because it is highly possible that the first Reed-Solomon decoder 48 makes an erroneous correction in the case where the supplemental data segment has an error in excess of, for example, 10 bytes.

The supplemental data segment from the demultiplexer 34 is provided to the MPEG header remover 51. The MPEG header remover 51 removes 3 bytes of MPEG header from the supplemental data segment. The MPEG header is inserted when the supplemental data is transmitted in an ATSC format at the VSB transmission system.

The null sequence remover 52 then removes the null sequence inserted in the supplemental data segment at the null sequence inserter in the VSB transmission system. The second data deinterleaver 53 acts in reverse of the interleaving process on the supplemental data segment in the VSB transmission system. If the interleaving process is omitted in the VSB transmission system, the VSB reception system 300 may disable the second deinterleaver 53 or not include it at all. The second Reed-Solomon decoder 54 decodes the Reed-Solomon code of the supplemental data segment.

Since the predefined sequence is inserted in the supplemental data symbol only, the VSB reception system 300 is required to identify the supplemental data symbol, and to determine whether the predefined sequence from the transmission system is '0' or '1'.

The VSB reception system 300 in FIG. 11 improves a reception performance by using the predefined sequence inserted at the VSB transmission system. Referring to FIG. 11, the multiplexing information detector 33 detects the multiplexing information contained in the reserved area of the field synchronization signal segment and outputs a demultiplexing control signal. The demultiplexer 34 received the demultiplexing control signal for separating the bitstream into the supplemental data and the MPEG data packets by using the multiplexing information.

If the multiplexing information is included at the first supplemental data segment next to the field synchronization signal, then the multiplexing information detector 33 extracts that information from the decoded supplemental data and uses this for more robust tracking of multiplexing information. Also, when the received data is the supplemental data, the multiplexing information detector 33 provides a demultiplexing control signal which facilitates bypassing of the first Reed-Solomon decoder 48 and thus not making the first Reed-Solomon decoding by using the multiplexing information from the field synchronizing signal.

Figure 12:
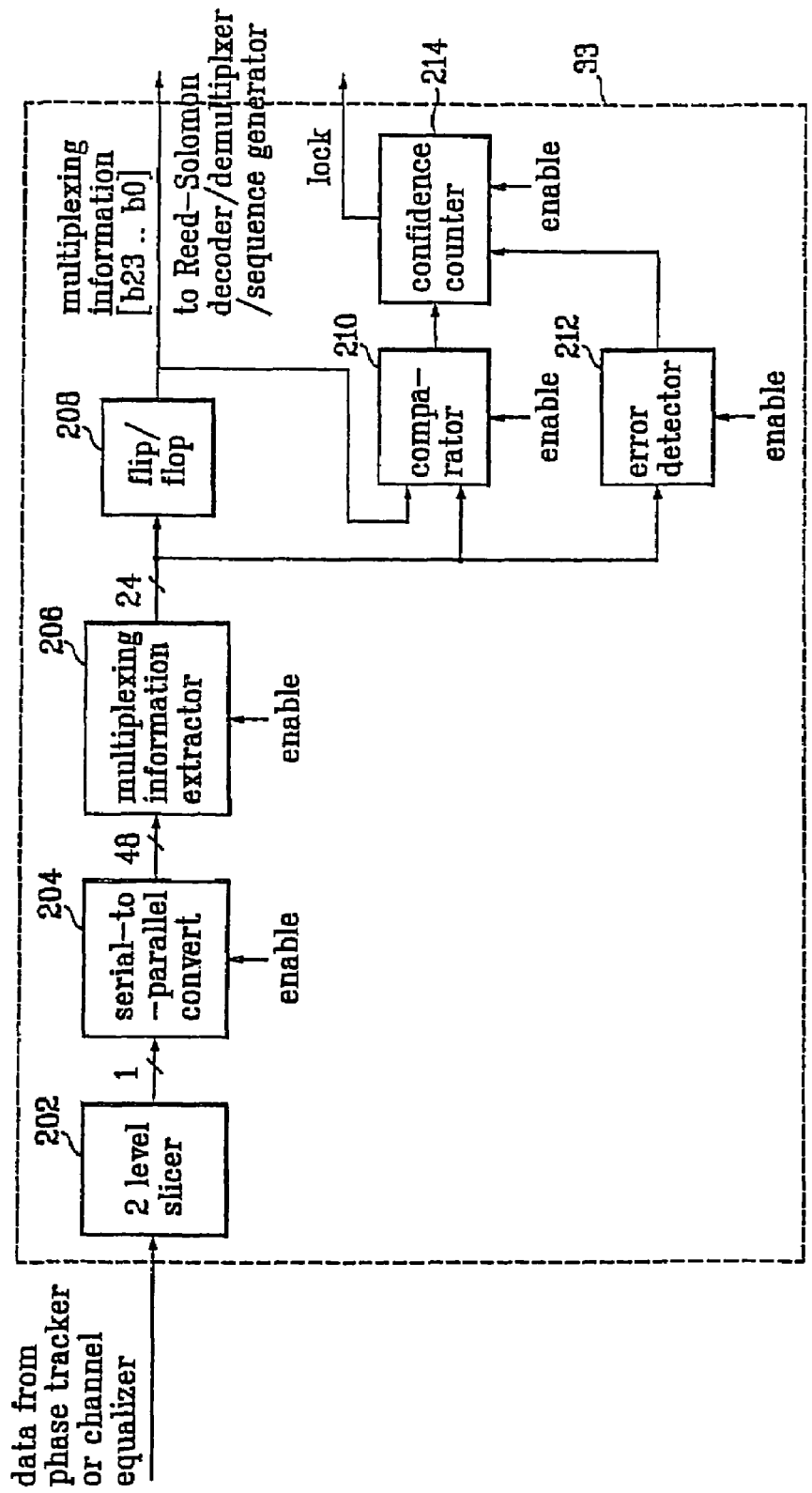
FIG. 12 illustrates a block diagram of the multiplexing information detector.

FIG. 12 illustrates a block diagram of the multiplexing information detector 33 according to the preferred embodiment of the present invention. According to FIG. 12, the multiplexing information detector 33 includes a 2-level slicer 202, a serial-to-parallel converter 204, a multiplexing information extractor 206, and ancillary devices, such as flip-flop 208, comparator 210, confidence counter 214 and error detector 212.

The 2-level slicer 202 decides the sign of the received data from, for example, the phase tracker 45 of the modified legacy VSB receiver 32. The serial-to-parallel converter 204 converts the bit stream of the multiplexing information to 48-bit parallel data. The multiplexing information extractor 206 extract only the 24-bit multiplexing information (also referred to as payload data b23 . . . b0) out of the 48-bit data discarding the comb filter compensation bits. The 24-bit flip-flop latches the multiplexing information to the sequence generator 31, the first Reed-Solomon decoder 48 and the demultiplexer 34. The error detector 212 checks if the compensation bits [b23 . . . b0] are the complements (e.g., negated [b23 . . . b0]) of payload bits [b23 . . . b0] and if [b23 . . . b16] equals [b7 . . . b0] when [b15 . . . b8]=0×00. If error is detected, the error detector holds the confidence counter 214.

Referring to FIG. 12, the comparator 210 compares the multiplexing information of current field segment with the ones of previous field (the content of the flip-flop 208). If they are the same, then the comparator 210 causes the confidence counter 214 to be incremented by one. If not the same, then the confidence counter 214 is decreased by one. The confidence counter 214 sets the lock signal to "1" if the counter value is greater than a threshold. If the lock signal is enabled, a transition from an acquisition process to a tracking process occurs.

In FIG. 12, the enable signals provided to the various components of the multiplexing information detector 33 allows such components to be preferably enabled near the end of each field sync segment.

The above described process allows the VSB receiver to reliably and simply acquire the multiplexing information by correlation. This process is called an acquisition process. It is also necessary, for the VSB receiver, which has already acquired the information by correlation of field sync data, to be then able to instantly and reliably track changes in the P value (number of supplemental data packets in a field).

In this regard, the multiplexing information from a data field, excluding the comb filter compensation bits, is duplicated in the first supplemental segment of the data field. As a result, the VSB receiver tracks changes more reliably using robustly coded multiplexing information contained in the first supplemental segment. If the VSB receiver finds that the multiplexing information previously acquired by field sync correlation does not match the one in the first supplemental segment, the multiplexing information detector restart the acquisition process.

The VSB communication system of the present invention has the following advantages. First, the use of the predefined sequence and the multiplexing information in transmission of the MPEG data and the supplemental data on a channel makes the VSB communication system of the present invention more robust to channel impairment.

Second, the VSB communication system of the present invention has backward compatibility with the related art VSB reception system.

Third, the use of the predefined sequence and the multiplexing information permits the VSB communication system of the present invention to receive the supplemental data without an error even on a channel having ghost and noise heavier than the related art VSB communication system.

Fourth, the multiplexing of the supplemental data and the MPEG data under a fixed rule improves the decoding performance of the supplemental data in the VSB reception system.

Fifth, the broadcaster can change the number of supplemental packets to be multiplexed (i.e., the P value).

It will be apparent to those skilled in the art that various modifications and variations can be made in the VSB communication system of the present invention without departing from the spirit or scope of the invention. Thus, it is intended that the present invention cover the modifications and variations of this invention provided they come within the scope of the appended claims and their equivalents.

What is claimed is:

1. A VSB reception system for receiving a data field comprising multiplexed main data segments and enhanced supplemental data segments, the VSB reception system comprising:
   a VSB receiver for receiving and decoding the data field;
   a multiplexing information detector for detecting multiplexing information from the data field, wherein the multiplexing information contains information required for demultiplexing the main data segments and the enhanced supplemental data segments from the decoded data field;
   a demultiplexer for demultiplexing the data field based on the detected multiplexing information into the main data segments and the enhanced supplemental data segments; and
   a supplemental data processor for processing the enhanced supplemental data segments demultiplexed from the demultiplexer to obtain original supplemental data packets.

2. The VSB reception system of claim 1, wherein the multiplexing information is included in a field synchronizing signal segment included in the data field.

3. The VSB reception system of claim 1, wherein the enhanced supplemental data segments and the main data segments in the data field are multiplexed at a predetermined ratio.

4. The VSB reception system of claim 3, wherein a MAP of the plurality of supplemental data segments in the data field is expressed by the following equations:

$$\text{for } 0 \leq P \leq 39: \text{MAP} = \{s|s = 4i+1, i = 0, 1, \ldots, 2P-1\};$$

$$\text{for } 40 \leq P \leq 78: \text{MAP} = \{s|s = 4i+1, i = 0, 1, \ldots, 77\} U$$
$$\{s|s = 4i+3, i = 0, 1, \ldots, 2P-79\};$$

$$\text{for } 79 \leq P \leq 117: \text{MAP} = \{s|s = 4i+1, i = 0, 1, \ldots, 77\} U$$
$$\{s|s = 4i+3, i = 0, 1, \ldots, 77\} U$$
$$\{s|s = 4i+2, i = 0, 1, \ldots, 2P-157\}; \text{ and}$$

$$\text{for } 118 \leq P \leq 156: \text{MAP} = \{s|s = 4i+1, i = 0, 1, \ldots, 77\} U$$
$$\{s|s = 4i+3, i = 0, 1, \ldots, 77\} U$$
$$\{s|s = 4i+2, i = 0, 1, \ldots, 77\} U$$
$$\{s|s = 4i+4, i = 0, 1, \ldots, 2P-235\};$$

wherein "P" denotes a number of the original supplemental data packets, and "s" denotes a supplemental data segment position with respect to a field synchronizing signal segment within the data field.

5. The VSB reception system of claim 3, wherein the multiplexing information comprises a number of the original supplemental data packets.

6. The VSB reception system of claim 3, wherein the predetermined ratio is 1:1 or 1:3.

7. The VSB reception system of claim 3, wherein a total number of the enhanced supplemental data segments and the main data segments included in the data field is 312.

8. The VSB reception system of claim 3, wherein the main data segments comprise MPEG data segments.

9. The VSB reception system of claim 3, wherein positions of the enhanced supplemental data segments are assigned to every fourth segment from at least one predetermined start position within the data field.

10. A method of processing digital broadcast data in a digital television (DTV) receiver, the method comprising:
    demodulating a DTV signal in a demodulator, the DTV signal containing first service data multiplexed with second service data;
    detecting signaling information from the demodulated DTV signal in a detector;
    decoding the first service data in the demodulated DTV signal in a first decoder for first error correction in order to correct errors in the first service data that occurred during reception of the DTV signal; and
    decoding the error-corrected first service data in a second decoder for second error correction in order to additionally correct errors in the first service data that occurred during reception of the DTV signal.

11. The method of claim 10, wherein the signaling information is included in the first service data.

12. The method of claim 10, wherein the first service data are Reed-Solomon (RS) decoded for the second error correction.

13. The method of claim 10, further comprising detecting predefined data included in the demodulated first service data.

14. The method of claim 13, further comprising performing channel equalization on the demodulated first service data using the predefined data.

15. The method of claim 10, further comprising decoding the first and second service data in the demodulated signal for third error correction.

16. The method of claim 10, wherein the first and second service data are trellis-decoded for the third error correction.

17. The method of claim 10, wherein the first service data comprise additional service data and the second service data comprise data for legacy VSB receiver.

18. A transmission system for processing audio/video (AV) data, the transmission system comprising:
    an RS encoder configured to RS encode first AV data having a first attribute for forward error correction (FEC) by adding RS parities to the first AV data, the first AV data input to the RS encoder through a first path and including at least audio or video data;
    a multiplexer configured to multiplex the RS-encoded first AV data with second AV data based on multiplexing information, the second AV data input to the multiplexer through a second path different from the first path and having a second attribute different from the first attribute and including at least audio or video data; and an interleaver configured to interleave the multiplexed first and second AV data for burst error correction, the interleaver dispersing the multiplexed first and second AV data.

19. The transmission system of claim 18, further comprising a pilot inserter configured to insert pilot signals into the interleaved first and second AV data.

20. The transmission system of claim 18, further comprising a trellis coder configured to convert the interleaved first and second AV data into corresponding symbols.

21. The transmission system of claim 18, wherein the multiplexing information comprises multiplexing ratio and locations.

22. A method of processing AV data in a transmission system, the method comprising:

RS encoding first AV data in an RS encoder by adding RS parities to the first AV data, the first AV data input to the RS encoder through a first path and having a first attribute for forward error correction (FEC) and including at least audio or video data;

multiplexing the RS-encoded first AV data with second AV data in a multiplexer based on multiplexing information, the second AV data input to the multiplexer through a second path different from the first path and having a second attribute different from the first attribute and including at least audio or video data; and interleaving the multiplexed first and second AV data in an interleaver for burst error correction, wherein interleaving the multiplexed first and second AV data comprises dispersing the multiplexed first and second AV data.

23. The method of claim 22, further comprising inserting pilot signals into the interleaved first and second AV data.

24. The method of claim 22, further comprising converting the interleaved first and second AV data into corresponding symbols.

25. The method of claim 22, wherein the multiplexing information comprises multiplexing ratio and locations.

* * * * *